(12) United States Patent
Murphy et al.

(10) Patent No.: US 7,657,554 B2
(45) Date of Patent: Feb. 2, 2010

(54) METHOD AND SYSTEM FOR MANAGING USER INTERFACE MESSAGES

(75) Inventors: Shawn M. Murphy, Seattle, WA (US);
Walter Smith, Seattle, WA (US);
Stephen K. Brown, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 306 days.

(21) Appl. No.: 10/982,531

(22) Filed: Nov. 5, 2004
(Under 37 CFR 1.47)

(65) Prior Publication Data
US 2006/0101034 A1    May 11, 2006

(51) Int. Cl.
*G06F 17/00* (2006.01)
(52) U.S. Cl. ...................... 707/102; 715/206
(58) Field of Classification Search ............... 707/102, 707/3; 715/513; 345/10; 705/9
See application file for complete search history.

(56) References Cited

U.S. PATENT DOCUMENTS

| | | | | |
|---|---|---|---|---|
| 5,347,629 | A * | 9/1994 | Barrett et al. | 715/762 |
| 5,398,312 | A * | 3/1995 | Hoffmann | 604/218 |
| 6,185,600 | B1 | 2/2001 | Spence et al. | 709/203 |
| 6,504,555 | B1 * | 1/2003 | Slupe et al. | 715/762 |
| 6,768,975 | B1 * | 7/2004 | Gill et al. | 703/13 |
| 7,024,365 | B1 * | 4/2006 | Koff et al. | 704/270.1 |
| 7,024,681 | B1 * | 4/2006 | Fransman et al. | 725/115 |
| 2001/0040900 | A1 * | 11/2001 | Salmi et al. | 370/487 |
| 2002/0049745 | A1 * | 4/2002 | Yuichiro et al. | 707/1 |
| 2002/0095407 | A1 * | 7/2002 | Itakura et al. | 707/3 |
| 2002/0133523 | A1 * | 9/2002 | Ambler et al. | 707/536 |
| 2002/0196285 | A1 * | 12/2002 | Sojoodi et al. | 345/771 |
| 2002/0198798 | A1 * | 12/2002 | Ludwig et al. | 705/35 |
| 2003/0033284 | A1 * | 2/2003 | Warren et al. | 707/1 |

(Continued)

FOREIGN PATENT DOCUMENTS

EP        564790 A2 *  10/1993

(Continued)

OTHER PUBLICATIONS

Structure of User Interface module for pratical internet messages, Morioka Tomohiko, (pp. 373-374, Proceedings of the Third Asian Computing Science Conference on Advances in Computing Science, 1997).*

(Continued)

*Primary Examiner*—Pierre M Vital
*Assistant Examiner*—Augustine Obisesan
(74) *Attorney, Agent, or Firm*—Shook, Hardy & Bacon L.L.P.

(57) ABSTRACT

A system, method, data structures and computer-accessible medium is provided for storing, managing, and tracking the development of messages for computer program products. Message and message-related data for messages which computer program products display to users as part of the product's user interface are centralized in a message catalog. A message catalog schema describes the attributes of a message separately from the attributes of one or more conditions for which a message should be displayed. Interfaces are provided for creating, localizing, documenting, maintaining, displaying, and supporting messages and message-related data in a message catalog consistent with the message catalog schema. Notifications to owners of the messages and conditions is performed periodically or whenever a change has been detected.

37 Claims, 16 Drawing Sheets

U.S. PATENT DOCUMENTS

| | | | |
|---|---|---|---|
| 2003/0105884 A1* | 6/2003 | Upton | 709/318 |
| 2003/0154183 A1* | 8/2003 | Warren | 707/1 |
| 2003/0212982 A1* | 11/2003 | Brooks et al. | 717/100 |
| 2003/0229514 A2* | 12/2003 | Brown | 705/2 |
| 2004/0049519 A1* | 3/2004 | Itakura et al. | 707/104.1 |
| 2004/0176667 A1* | 9/2004 | Mihai et al. | 600/300 |
| 2004/0193586 A1* | 9/2004 | Sashida et al. | 707/3 |
| 2004/0254945 A1* | 12/2004 | Schmidt et al. | 707/100 |
| 2006/0069605 A1* | 3/2006 | Hatoun | 705/9 |
| 2006/0123053 A1* | 6/2006 | Scannell, Jr. | 707/104.1 |

FOREIGN PATENT DOCUMENTS

| | | | |
|---|---|---|---|
| EP | 622729 A2 * | 11/1994 | |
| EP | 798634 A1 * | 10/1997 | |

OTHER PUBLICATIONS

Macromedia RoboHelpX5 product information, © 2004 eHelp Corporation, retrieved from Internet, 2 pages.

RoboHelp products information, © 1994-2004 eHelp Corporation, retrieved from Internet, 2 pages.

* cited by examiner

| | Condition Details for COND I AU_No Server ▼ | | View Save Delete New |
|---|---|---|---|
| 1205 — Condition ID | COND I | | |
| 1210 — Symbol | AU_NOSERVER ▼ | | |
| 1215 — Message ID | 547 ▼ | | |
| 1220 — Status | Needs Review ▼ | | |
| 1225 — Features | Auto-Update ▼ | Manifest Download ▼ | |
| 1230 — Expected Use | Dialog ▼ | | — 1235B |
| 1235 — Dependencies | Local Components | Online Services | |
| 1235A — | ABCBROWSER.DLL | CLIENT.ABC.COM | — 1260A |
| 1240 — Documentation ▼ | | | |
| 1245 — | Audience All Users ▼ | Internal Use Only | — 1250 |
| 1260 — Cause | SAMPLE TEXT | SAMPLE TEXT | — 1260A |
| 1265 — Context | SAMPLE TEXT | SAMPLE TEXT | — 1265A |
| 1270 — Workaround | SAMPLE TEXT | SAMPLE TEXT | — 1270A |
| 1275 — Resolution | SAMPLE TEXT | SAMPLE TEXT | — 1275A |
| 1280 — Operations ▼ | | | |
| 1285 — Escalation Steps | SAMPLE TEXT | | |
| 1290 — Ownership ▼ | | | |
| 1290A — PM Owner | ALICE | Signoff: None | Approve  Reject |
| 1290B — Dev Owner | TED | Signoff: None | |
| 1290C — Test Owner | BOB | Signoff: None | |
| 1290D — UA Owner | UGrant | Signoff: None | |
| 1290E — PSS Owner | GWash | Signoff: None | |
| 1290F — Ops Owner | ALincoln | Signoff: None | |
| | Preview ▼ | | |

| Home | SQM dataports | Error catalog | View reports | Create reports | Ask for something | Admin |

Ui Message Catalog Record

1305 — Search Conditions
You can search the catalog for a specific condition or symbol, run a pre-defined query to return a set of messages, or build your own custom query.

- 1310 — ⦿ Lookup the details for condition ID or symbol [AU____]
- 1315 — ○ Use this query [Everything I own for an editable version ▼]
- 1320 — ○ Custom search in Feature [All ▼] for Version [Next Major Ver ▼]
- 1325 — ☐ Narrow the request so that:
  - 1325A — { [Category ▼] [Equals ▼] [_____]
    ☐ [and ▼] [Error Code ▼] [Equals ▼] [Enter search text] }
- 1330 — [Search Now]
- 1335 — ☐ Show message display container in user interface in search results

1340 — Search Results
Additional information about these messages and conditions are available if you click on the links.

| 1345 — UI Message | Status ▼ | Conditions | | PM Owner ▼ |
|---|---|---|---|---|
| 1350 — We're sorry but the update did not complete successfully | Needs Review | COND I | AU_NOSERVER | ALICE |
| | | COND II | AU_NONETWORK | ALICE |
| | | COND III | AU_MANIFEST_NOTAVAIL | ALICE |
| | | COND IV | AU_MANIFEST_CORRUPT | TED |
| | | COND V | AU_MANIFEST_NOCHEXKSUM | BOB |
| 1355 — We're sorry but the update did not complete successfully. Please try again later. | Final Text | COND VI | AU_NOSERVER | ALincoln |
| | | COND VII | AU_NONETWORK | ALincoln |
| 1360 — I am a dialog message, what are you? | Needs Review | COND I | AU_NOSERVER | ALICE |
| | | COND II | AU_NONETWORK | ALICE |
| | | COND III | AU_MANIFEST_NOTAVAIL | ALICE |
| | | COND IV | AU_MANIFEST_CORRUPT | TED |
| | | COND V | AU_MANIFEST_NOCHEXKSUM | BOB |

1365 —
I want to...
Create a new message
View reports about messages and conditions
Learn more about the Message Catalog

*Fig. 13.*

| | Home | SQM dataports | Error catalog | View reports | Create reports | Ask for something | Admin |

UI Message Catalog Bulk Edit Tool

1405 — What do you want to change?
Making bulk changes in the catalog is simple. Just specify what you want to change, a brief comment, and then select the items that should receive these changes in the list of things you own below. NOTE: Once you save these changes on an administrator can back the changes out, so be careful.

1410 — ⦿ Re-assign my ownership to [BOB]
1415 — ○ Sign off as [Approved ▼]
1420 — ○ Set the status to ["Final Text" ▼]
1425 — ○ Delete them 1430 — Please explain why you are making this change
[Current owner ALICE is tranferring to new job]

1435 — [Save Changes]

1440 — What records are you changing?
The following is the current list of stuff you own in the catalog. Please select the items that should receive these changes 1445 — ☐ Select everything

| 1455 — UI Message | Conditions | How Owned ▼ |
|---|---|---|
| 1460 — ☐ We're sorry but the update did not complete successfully | ☐ COND I AU_NOSERVER<br>☐ COND II AU_NONETWORK<br>☐ COND III AU_MANIFEST_NOTAVAIL<br>☐ COND IV AU_MANIFEST_CORRUPT<br>COND V AU_MANIFEST_NOCHEXKSUM | PM Owner<br>PM Owner<br>PM OWner<br>Dev Owner |
| 1465 — We're sorry but the update did not complete successfully. Please try again later. | ☐ COND I AU_NOSERVER<br>☐ COND II AU_NONETWORK | PM Owner<br>PM Owner |
| 1470 — ☐ I am a dialog, what are you? | ☐ COND I AU_NOSERVER<br>COND II AU_NONETWORK<br>COND I AU_NOSERVER | Pm Owner,Dev |
| 1475 | ☐ OCND II AU_NONETWORK<br>☐ COND II AU_NONETWORK<br>COND I AU_NOSERVER<br>COND II AU_NONETWORK | PSS Owner<br>PSS Owner |

I want to...
Find a specific record and just make changes to it
Make other bulk changes
Bulk change records not listed above

| From: | UIMessageCatalog |
|---|---|
| Sent: | Wednesday, September 1, 2004 11:30 AM |
| To: | ABC Browser Product Manager |
| Subject: | UI Message Catalog Daily Changes |

ABC Browser UI Message Catalog Changes On 9/1/2004
The following changes happened to messages or conditions in the UI Message Catalog for the ABC Browser product for which you are listed as an owner, or that are associated with other messages or conditions for which you are listed as an owner.

| Message | Status |
|---|---|
| I'm sorry you can't login ... | Created |
| Are you sure you want to delete this ... | Locked |
| You're modem is on fire would you like to ... | Major changes |
| Would you like to save this ...<br>UI Text, Default Button, Button Type, PM Owner | New Version |

| Condition | Status |
|---|---|
| Condition Code I - Passport Authentication Fails<br>Message - I'm sorry you can't login... | Created |
| Condition Code II - Modem exploded<br>I'm sorry you can't login...<br>Cause (Public), Workaround (Public) | Created |
| Condition Code III - Modem on fire<br>Message - You're modem is on fire would you like to ... | Major changes |
| Condition Code IV - Clicked Delete Button in compose email<br>Are you sure you want to delete this ... | Locked |
| Condition Code V - Clicked Delete Button in compose email<br>Are you sure you want to delete this ... | New Version |

Why did I get this mail?
The UI Message Catalog automatically sends email if there have been changes made today in the catalog for errors or dialogs you are an owner of, or dialogs that are associated to an error you own. You can review the current state of the database as well as the changes by clicking on the links above.

*Fig.15.*

| From: | UI Message Catalog |
| --- | --- |
| Sent: | Wednesday, September 1, 2004 11:30 AM |
| To: | ABC Browser Product Manager |
| Subject: | UI Message Catalog Status |

ABC Browser UI Message Catalog Status As Of 9/1/2004

The following email summarizes the status of the messages and conditions currently tracked in the UI Message Catalog for which you are the owner.

CONDITIONS (listed by version)

Next Version "Main"

252 owned as PM Owner
10 have incomplete documentation
6 need your signoff
40 need signoff by one or more of the other owners 1 owned as Test Owner
1 need your signoff
1 need signoff by one or more of the other owners

V2 QFE 3

251 owned as PM Owner
No problems detected

MESSAGES (listed by version)

Next Version "Main"

25 owned as PM Owner
20 where status isn't locked
6 need your signoff
25 need signoff by one or more of the other owners 3 associated to errors you own
3 aren't locked down
1 need signoff by one or more of the other owners

V2 QFE 3

22 owned as PM Owner
No problems detected 3 associated to errors you own
1 where status isn't locked

Why did I get this mail? The UI Message Catalog automatically sends email twice a month to the owners of messages and conditions for editable versions in the UI Message Catalog. The purpose of these messages is to keep you informed of the status of your conditions, and the messages on which your conditions depend.

*Fig.16.*

METHOD AND SYSTEM FOR MANAGING USER INTERFACE MESSAGES

FIELD OF THE INVENTION

In general, the present invention relates to messages generated by computer program products, and, in particular, to systems and methods for managing such messages.

BACKGROUND OF THE INVENTION

As complex software products are developed, the task of creating messages to respond to various events and conditions arising during the product's use is rarely given adequate time and attention. Instead, messages typically creep into the product's user interface as it's developed, without planning and review by product management, user assistance, development, test, or other disciplines having an interest in how user interface (UI) messages are presented to a user. As the product nears its ship date, there is an oftentimes frantic effort to find and clean up the product's UI messages prior to its release. This can result in UI messages that are unclear, inconsistent, and not helpful to users, leading to decreased customer satisfaction as well as an increased burden on customer support staff.

Furthermore, without central management of messages, the communication to a product's technical support staff of which event or condition led to a particular message is made significantly more difficult. For example, a product developed without adequate attention given to message management is typically more prone to gaps in messages to handle the various events and conditions as they arise. The gaps make product support much more challenging, again leading to decreased customer satisfaction.

SUMMARY OF THE INVENTION

The foregoing problems with the prior state of the art are overcome by the principles of the present invention, which is directed toward methods, systems, computer-accessible media, and data structures for storing, managing, and tracking the development of messages for computer program products. In particular, the present invention is further directed toward methods, systems, computer-accessible media, and data structures for creating, localizing, documenting, maintaining, displaying, and supporting messages and message-related data.

In accordance with one aspect of the present invention, the system comprises a message catalog in which to centralize message and message-related data for messages which computer program products display to users as part of the product's user interface. The message catalog may be implemented in a database in which message and message-related data is stored in data structures that are defined in accordance with a message catalog schema. The message catalog schema describes the attributes of a message, including the resources for managing and tracking the development of a message, the resources for displaying the message to users, and the identity of one or more conditions for which the message is displayed to users. The message catalog schema further describes the attributes of a condition, the occurrence of which triggers a display of the message for which the condition has been identified. The attributes of a condition may include, among others, the identity of the message to display when the condition occurs and the documentation of the condition, including documentation provided to users, i.e., the public, as well as documentation for internal use only.

In accordance with another aspect of the present invention, the attributes of the messages and conditions may include the identity of their owners. The message catalog schema may further describe the attributes of an owner, including the owner's authority to change their messages and conditions, as well as the owner's preferences in receiving notifications about the messages and conditions which they own.

In accordance with yet another aspect of the present invention, the attributes of the messages and conditions may include the version or versions of the product with which they are associated. The message catalog schema may further describe the attributes of each version of a product, including whether the version has shipped and whether the messages and conditions associated with that version may be edited. When messages and conditions are associated with a version that has shipped, or are otherwise un-editable, they may be associated with a new version branched from the shipped version to allow editing.

In accordance with another aspect of the present invention, the message catalog schema may further describe the attributes of the users to whom the messages and conditions are to be displayed, i.e., the local audience. The attributes of messages and conditions may be localized to the local audience using the local audience attributes including, among others, the level of expertise and/or the language of the local audience as described in the message catalog schema.

In accordance with one aspect of the present invention, the system comprises one or more interfaces for creating, localizing, documenting, maintaining, displaying, and supporting messages and message-related data in a message catalog consistent with the message catalog schema described above. The interfaces may include a management interface comprising a graphical user interface for searching, viewing, and editing messages and conditions. The interfaces may further include a client interface comprising an application programming interface (API) for computer program products to report, retrieve, and log the messages and conditions stored in the message catalog.

In accordance with yet other aspects of the present invention, a computer accessible, i.e., computer-readable, medium for storing and managing messages for computer program products is provided, including a medium for storing data structures and computer-executable components for creating, localizing, documenting, maintaining, displaying, and supporting messages and message-related data in a message catalog. The data structures define the messages and conditions in a manner that is generally consistent with the above-described systems and methods. Likewise, the computer-executable components, including the management and client interfaces, are capable of performing actions generally consistent with the above-described systems and methods.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 10-14 are pictorial diagrams of certain aspects of an exemplary message catalog management interface formed in accordance with an embodiment of the present invention; and FIGS. 15-16 are pictorial diagrams of certain aspects of exemplary message catalog notifications formed in accordance with an embodiment of the present invention.

DETAILED DESCRIPTION

Figure 1:
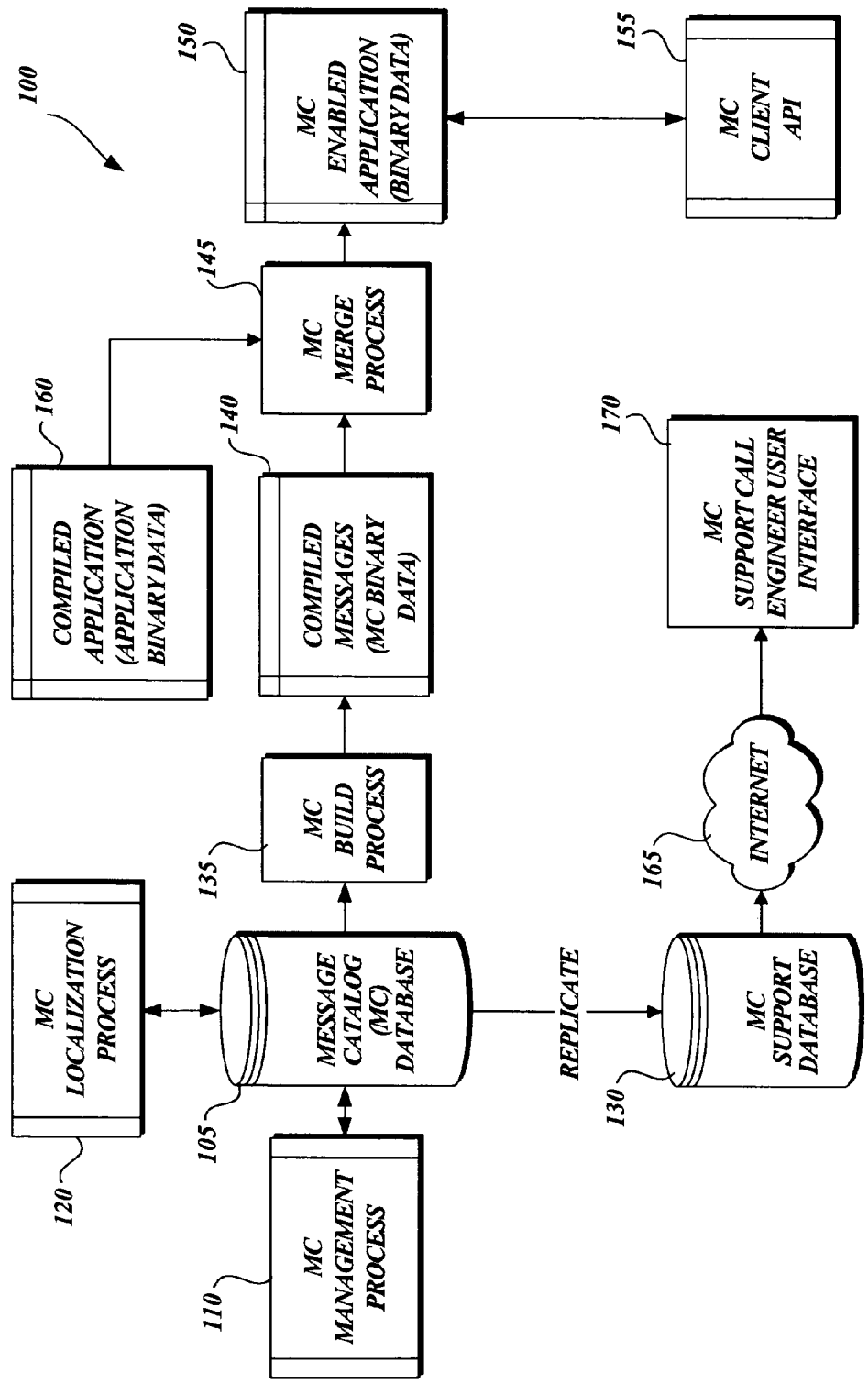
FIG. 1 is a block diagram overview of an exemplary system to facilitate storing and managing messages for computer program products in accordance with an embodiment of the present invention.

FIG. 1 is a block diagram overview of an exemplary system 100 to facilitate storing and managing messages for computer program products in accordance with an embodiment of the present invention. As illustrated, the system includes, among other components, a message catalog ("MC") database 105, an MC management interface 110, an MC localization process 120, an MC support database 130, an MC build and merge processes 135 and 145, an MC client application programming interface ("API"), and an MC support call engineer interface 170.

In a typical operating scenario, the MC database 105 is populated with message and message-related data for one or more products using the MC management interface 110. In one embodiment, the management interface 110 is implemented as a set of web-based interfaces as described in further detail with reference to FIGS. 4-7 and FIGS. 10-14. The message and message-related data stored in the MC database 105 include the various resources that a product's user interface uses to report the message to the user, such as the specific text of the message, whether to use a standard display container to report the message, the icon used when displaying the message, etc., as well as documentation about the specific events and conditions that would cause the product to report the message to the user. In a typical embodiment the standard display container may be a dialog box, but the display container might also be other types of display containers used in a graphical user interface, such as balloons, notifications, panels, taskbars, and task panes. The message and message-related data stored in the MC database 105 may further include the various resources used to manage and track the development of the message, such as the product and version with which the message is associated, and the message's owner and status. The contents of the MC database 105 are described in further detail with reference to FIG. 2.

The MC localization process 120 is a component of the system 100 that is used to localize the content of the MC database 105 to the various levels of expertise and/or dominant language of the users to whom the product's messages are displayed, i.e., the local audience. In one embodiment the localization process may be used, for example, to vary the level of detail displayed in the message based on the level of expertise of the local audience, or to translate the text of the messages to the language of the local audience.

In a typical embodiment, the MC support database 130 is replicated from the MC database 105 and made accessible via the Internet 165 to an MC support call engineer user interface 170. For example, the support call interface 170 may expose various message related data that is not typically displayed to the product's users, such as documentation about the event or condition that triggered the product to report the message, including, for example, what steps to take to correct problems associated with occurrence of the event or condition.

Once the message and message-related data has been created in the MC database, the product developers may include in their product application software calls to an MC client API 155 whenever an event or condition occurs for which the developer wants to display a message. The operation of the MC client API 155 is described in further detail with reference to FIG. 3.

In a typical embodiment, the MC build process 135 is used to move data for a particular product's messages from the MC database 105 into the product's application software by compiling the data into a compiled messages format 140. The MC merge process 145 merges the compiled messages 140 with the compiled product application software 160, resulting in an MC-enabled application or product 150. For example, the product's compiled messages may be formatted as MC binary data 140 that is merged with application binary data 160 to form the MC-enabled application or product 150. In operation, the MC-enabled application 150 uses the calls that were included in the product's application software to call the MC client API 155 whenever an event or condition occurs for which a message should be displayed.

Figure 2:
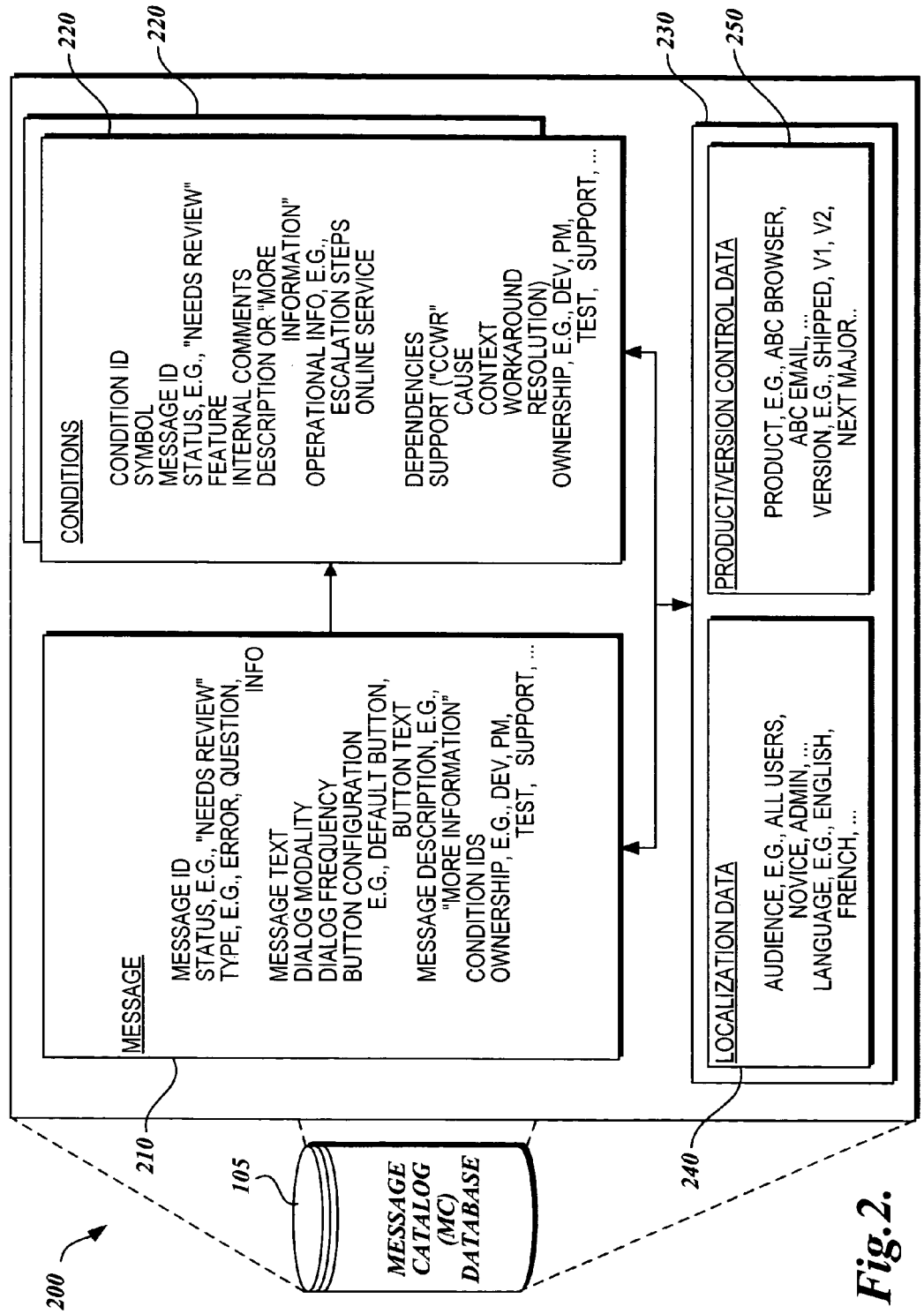
FIG. 2 is a block diagram depicting in further detail a message catalog to facilitate storing and managing messages for computer program products as illustrated in the system in FIG. 1, and in accordance with an embodiment of the present invention.

FIG. 2 is a block diagram depicting in further detail a message catalog to facilitate storing and managing messages for computer program products as illustrated in the system in FIG. 1, and in accordance with an embodiment of the present invention. As illustrated, the MC database 105 contains data stored in data structures that are defined in accordance with a message catalog schema 200. The message catalog schema 200 generally represents data formats for defining UI messages and message-related data. For example, data structures representing UI messages may be defined in accordance with the message schema 210 and data structures representing the one or more events or conditions associated with each message may be defined in accordance with a condition schema 220.

In a typical embodiment, there is a one to many relationship between a message and the conditions or events that may trigger the message. Thus, the message catalog schema 200 may define one or more data fields that refer to link to other message-related information. In particular, a message defined in accordance with message schema 210 can include data fields that refer or link to one or more conditions defined in accordance with condition schema 220. As an example, a message representing a problem with connecting the user's computer to the Internet might be associated with several conditions related to the status of the user's modem, as illustrated in Table 1 below.

TABLE 1

| Message M | Condition Code I: Modem on fire |
|---|---|
| "We can't connect to the Internet because of a problem with your modem" [Back to sign-in screen] | Condition Code II: Modem exploded |
| | Condition Code III: Modem soaked with water |
| | Condition Code IV: Modem was vaporized |
| | Condition Code V: Modem shredded by dog |
| | Condition Code VI: Modem eaten ... |

Here, the message, uniquely identified as message M, generally describes a problem with the modem, whereas the multiple conditions, each uniquely identified by a condition code, specifically describe one of the possible problems with the modem.

In one embodiment, each message and condition can further define one or more data fields that refer or link to product/version and localization information 230 defined accordance with product/version schema 250 and localization schema 240. For example, the above-described message M generally describing the problem with the modem may be translated to Spanish when the localization schema describes a local audience whose dominant language is Spanish.

An example of a more detailed message catalog schema 200 is described in accordance with the principles of the present invention in Tables 2 and 3 below. In particular, the message schema 210 may include interrelated fields that describe attributes of a UI message as shown in Table 2 below. Since each message may be localized to a particular audience, the data structures representing a UI message may be further defined in accordance with a localization schema 240 as also shown in Table 2 below.

TABLE 2

| Attribute | Description |
|---|---|
| Product (SKU) | The product for which this UI message has been created. |
| Version | The version of the product to which this UI message pertains. |
| Language | For fields that are marked "[By Language]" the MC database contains the values for that field for each language so that the field may be localized |
| Audience Group | The set of audiences that can be selected for this product. For example "Free user," "Paid user," "All users," "Account Manager," or an age range, such as "7-10," "10-18," and "Adult." |
| Audience | The selected audience for this UI message. For fields that are marked "[By Audience]" the MC database contains the values for that field for each type of audience (e.g., administrator, user, novice) so that the field may be localized. |
| Message ID | A unique identifier for this UI message |
| Display Resources | |
| Message Type | A value of that indicates whether this UI message is displayed using a display container that represents an error (x), question (?) or informational (!), e.g., 0—error (X), 1—Question (?), and 2 - Informational (!). |
| Status | A value that indicates the current status of the UI message, e.g., 0 - Needs Review, 1—Reviewed by UA, 2—Final Text |
| Modality | A value that indicates the modality of the display container used to display the UI message to the user, e.g., 0—Application Modal, Always on Top [Default], 1—System Modal, Always on Top. |
| Icon | A value that identifies the icon that should appear in the display container, e.g., a proprietary icon that represents the product, or some other type of icon, e.g., smiley face, sad face, etc., appearing in the upper left corner of a dialog box. |
| Show Again? | A value that indicates whether or not the display container should include the "Don't show me this error again" checkbox. |
| Text [By Language] [By Audience] | A string containing the actual text of the UI message displayed to the user, e.g., the text of the UI message appearing in the display container. This value may contain '% n' tokens that are resolved at run time. |
| Parameter Description | A string containing a description of the parameters that are passed for this UI message |
| ButtonConfig | An integer value indicating the button configuration that should appear on the display container when displaying this UI message, e.g., 0—"&Ok," 1—"&Ok", "&Cancel," 2—"&Yes", "&No," 3 - "&Yes", "&No," and "&Cancel," 4—"&Try Again," "&Cancel," 5 - Custom 1 Button, 6—Custom 2 Buttons 7—Custom 3 Buttons |
| DefaultButton | An integer value indicating which button in the display container should be the default button, e.g., 0—No default button, 1—Button 1 default, 2—Button 2 default, 3—Button 3 default |
| CancelButton | An integer value indicating which button in the display container should be activated if the user "cancels" the display container (e.g., presses the <escape> key or clicks a link in 'More Information'), For example, 1—Button 1, 2—Button 2, or 3—Button 3. |
| Button1_Text [By Language] | Custom text for the first custom button |
| Button2_Text [By Language] | Custom text for the second custom button |
| Button3_Text [By Language] | Custom text for the third custom button |

TABLE 2-continued

| Attribute | Description |
|---|---|
| | *Ownership* |
| Dev Owner | A string containing the alias of the developer (Dev) who is responsible for this UI message |
| PM Owner | A string containing the alias of the program manager (PM) responsible for this UI message |
| UA/UI Owner | A string containing the alias of the user assistance (UA) analyst responsible for this UI message |
| | *Sign off* |
| Dev Signoff Status | An indicator of whether the Dev has approved/denied this UI message |
| PM Signoff Status | An indicator of whether the PM has approved/denied this UI message |
| UA/UI Signoff Status | An indicator of whether the UA has approved/denied this UI message |

The condition schema 220 may include interrelated fields that describe attributes of a condition associated with a UI message, as shown in Table 3 below. Since each condition may be localized to a particular audience, the data structures representing a condition may be further defined in accordance with the localization schema 240 as also shown in Table 3 below.

TABLE 3

| Attribute | Description |
|---|---|
| Product (SKU) | The product for which this condition may occur. |
| Version | The version of the product to which this condition pertains. |
| Language | For fields that are marked "[By Language]" the MC database contains the values for that field for each language so that the field may be localized |
| Audience Group | The set of audiences that can be selected for this product. For example "Free user," "Paid user," "All users," "Account Manager," or an age range, such as "7-10," "10-18," and "Adult." |
| Audience | The selected audience for this message. For fields that are marked "[By Audience]" the MC database contains the values for that field for each type of audience group (e.g., administrator, user, novice) so that the field may be localized. |
| Condition ID | A unique identifier for this condition |
| | *Documentation* |
| Message ID | The unique identifier of the UI message that is to be displayed when this condition occurs |
| Symbol | The code symbol for the UI message |
| Feature (Component) | The feature or component of the product from which this condition is generated |
| Sub-Feature (Sub-Component) | The sub-component or sub-feature of the product from which this condition is generated |
| Status | A value indicating the current status of the publicly stated cause, condition, workaround, resolution ("CCWR") data fields, e.g., 0—Needs Review, 1—Reviewed by UA, 2—Final Text |
| Expected Use | A value indicating the expected use of the message catalog for this condition. Generally, this represents how the developer expects to use the message catalog vis a vis the client API, e.g., 0—generate a standard message catalog display container for the condition using the UI resources described in the message catalog's message schema 210 (see Table 2), 1 - retrieve the text of the UI message associated with this condition for the developer to display in-line in the product's existing UI, 2—log the occurrence of the condition to a customer support repository, e.g., the Windows Event Log, and 3—logging the condition to other support repositories, e.g., instrumentation logs. |
| Service Dependencies | An ordered list of the online services/components that could be the cause of this condition |
| Component Dependencies | An ordered list of local components that could be the cause of this condition |
| Parameter Description | A description of the parameters that may be passed in for the UI message for this condition |

TABLE 3-continued

| Attribute | Description |
|---|---|
| *Ownership* | |
| Dev Owner | A string containing the alias of the developer who is responsible for this condition |
| PM Owner | A string containing the alias of the program manager responsible for this condition |
| Test Owner | A string containing the alias of the tester responsible for this condition |
| UA/UI Owner | A string containing the alias of the UA person responsible for this condition |
| Operations Owner | A string containing the alias of the ops engineer responsible for this condition |
| Support Owner | A string containing the alias of the support contact responsible for this condition |
| *Signoff* | |
| Dev Signoff Status | An indication of whether the developer has approved/denied this condition |
| PM Signoff Status | An indication of whether the product manager has approved/denied this condition |
| Test Signoff Status | An indication of whether the tester has approved/denied this condition |
| UA/UI Signoff Status | An indication of whether the user assistance analyst has approved/denied this condition |
| Operations Signoff Status | An indication of whether the operations analyst has approved/denied this condition |
| Support Signoff Status | An indication of whether the support analyst has approved/denied this condition |
| *Description and Documentation* | |
| Ops Escalation | A string containing the alias to which occurrences of this condition should escalate |
| Ops Escalation Steps | A string containing the verbose escalation steps for operations personnel when this condition occurs |
| Cause (Internal) [By Language] | A string containing the cause of this condition identified internally to support |
| Cause (Public) [By Language] [By Audience] | A string containing the cause of this condition as identified to the user |
| Context (Internal) [By Language] | A string containing the context in which this condition occurred as identified internally to support |
| Context (Public) [By Language] [By Audience] | A string containing the context in which this condition occurred as identified to the user |
| Workaround (Internal) [By Language] | A string containing the verbose workaround steps as identified for internal support |
| Workaround (Public) [By Language] [By Audience] | A string containing the verbose workaround steps as identified for the user |
| Resolution (Internal) [By Language] | A string containing the verbose resolution steps as identified for internal support |
| Resolution (Public) [By Language] [By Audience] | A string containing the verbose resolution steps as identified for the user |

In a typical embodiment, each message and condition may be associated with a product, including a particular version of a product. For example, to allow the owners, e.g., the product developers, to add, change or modify messages associated with a different version of the product, or a temporary fix to the product, e.g., a "quick fix engineering," or "QFE," the message catalog employs version control. Message catalog version control allows owners to edit their UI messages and conditions that are associated with a new version or QFE independently from the UI messages and conditions that they may have already created and approved for the next major release of the product.

In one embodiment, the message catalog schema 200 tags the messages and conditions to the versions of the product with which they are associated. Using the example described in Table 1, a particular UI message "M" might be associated with V1, V1 QFE 1 and V1 QFE 2 whereas a separate UI message, say UI message "X," may be associated with V1 QFE 3. Each version of the product has attributes which describe what can be edited for the messages and conditions associated with that version. Accordingly, the data structures representing a UI message and associated condition(s) may be further defined in accordance with a product/version control schema 250, an example of which is described in Table 4, below.

TABLE 4

| Attribute | Description |
| --- | --- |
| Version | A numerical reference identifying the version of the product |
| Version Name | A string containing the user-friendly name of the version |
| UI Editable? | An indication of whether or not the UI resources of the messages and conditions are editable for this version |
| Is Shipped? | An indication of whether or not this version has shipped |

Figure 3:
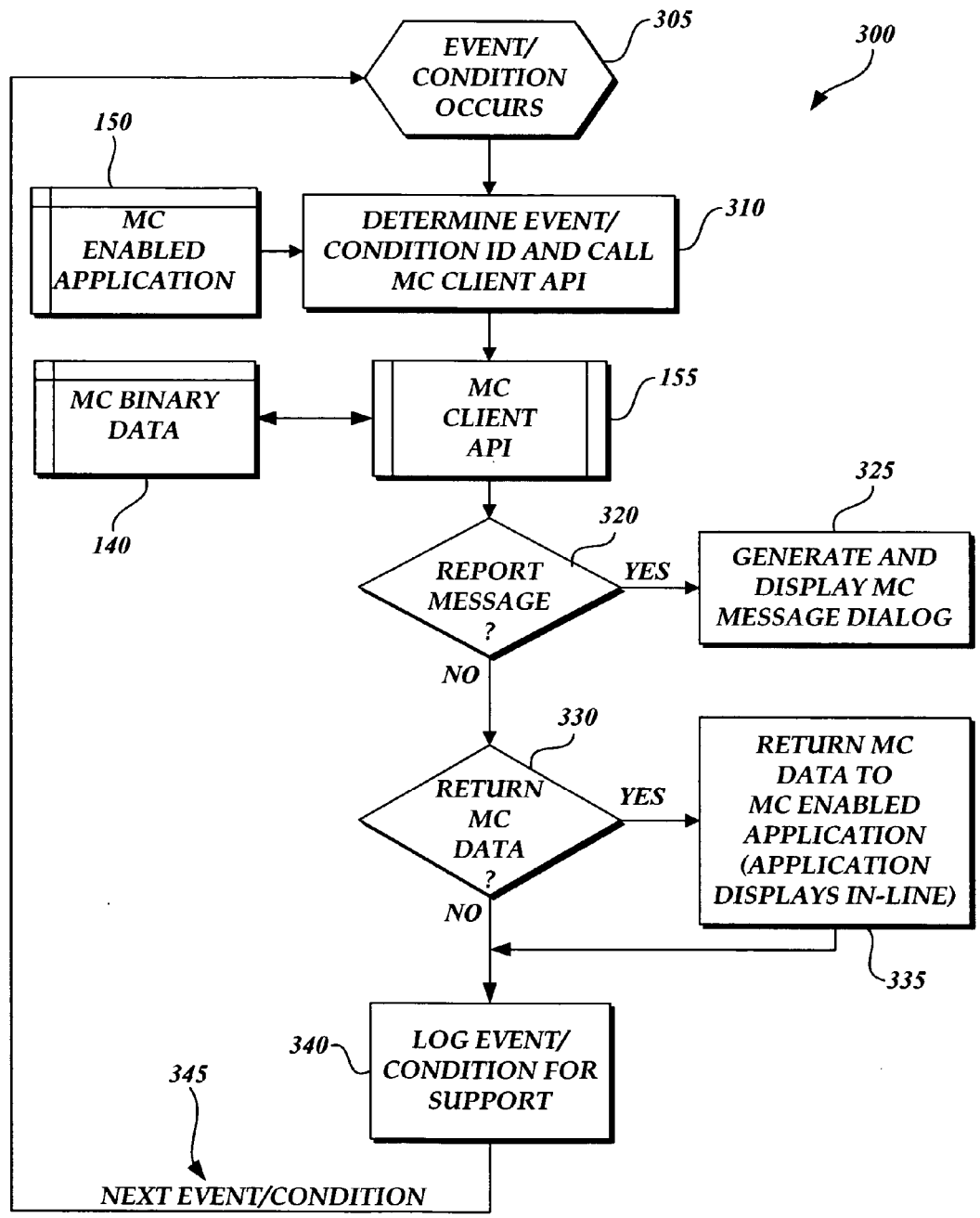
FIG. 3 is a flow diagram depicting in further detail certain aspects of the logic performed by a method for a client application programming interface (API) to the message catalog as illustrated in FIG. 1, and in accordance with an embodiment of the present invention.

FIG. 3 is a flow diagram depicting in further detail certain aspects of the logic performed by a method for a client application programming interface (API) to the MC database 105 as illustrated in FIG. 1, and in accordance with an embodiment of the present invention. In particular, FIG. 3 depicts a simplified overview of the operational flow 300 of an embodiment of the invention when an event or condition occurs in an MC-enabled application 150 for which a corresponding UI message and condition have been created in the MC database 105.

As illustrated, an event or condition occurs during a user's use of a product at preparation block 305, such as the failure to connect to the Internet using his or her computer's modem. At process block 310, an MC-enabled application 150, such as a Microsoft's MSN Explorer, determines that the event or condition that has occurred is one for which a condition ID has been created in the MC database 105, and further generates a call to the message catalog via the MC client API 155. At condition block 320, the MC Client API 155 determines whether the value of the Expected Use data field for the condition ID (as described in Table 3) indicates whether to generate a standard message catalog display container for the condition using the MC data, e.g., the UI resources for the message as described in message schema 210 (see Table 2), at process block 325. If not, at condition block 330, the MC Client API 155 determines whether the value of the Expected Use data field for the condition ID (as described in Table 3) indicates whether to retrieve and return the MC data, e.g., the text of the UI message associated with this condition, for the developer to display in-line in the product's existing UI, at process block 335. At process block 340, the MC Client API 155 continues by logging the occurrence of the condition to support repository, such as a customer support log. After completing the logging process, the operational flow 300 continues with the next event or condition at connection 345 as it occurs.

FIGS. 4-7 are flow diagrams illustrating certain aspects of the logic performed by a method for an MC management interface 110 for searching, viewing, and editing messages and conditions stored in the MC database 105 in conjunction with the system illustrated in FIGS. 1 and 2, and in accordance with an embodiment of the present invention.

Figure 4:
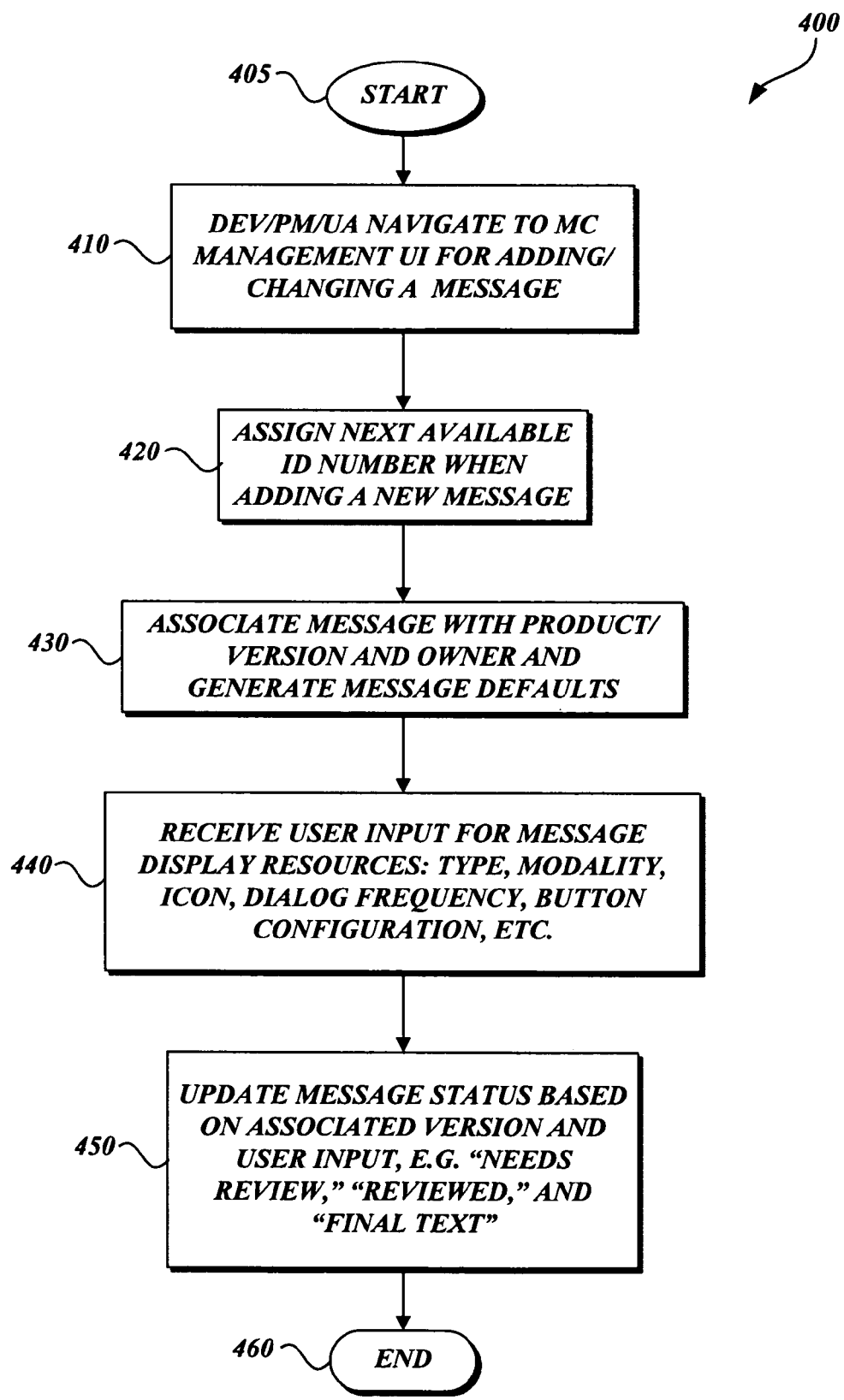
FIGS. 4-7 are flow diagrams illustrating certain aspects of the logic performed by a method for a management interface for searching, viewing, and editing messages and conditions stored in the message catalog in conjunction with the system illustrated in FIGS. 1 and 2, and in accordance with an embodiment of the present invention.

With reference to FIG. 4, a simplified overview of the operational flow 400 of an embodiment of the invention in which a user adds or changes a message in the MC database 105 using the MC management interface 110. At process block 410, a user of the MC management interface 110, such as a developer, product manager, or user assistance analyst, navigates to a graphical UI of the MC management interface for adding or changing a message. An example of an MC management UI is illustrated in FIGS. 10-11, at reference numerals 1000 and 1100, respectively.

Figure 10:
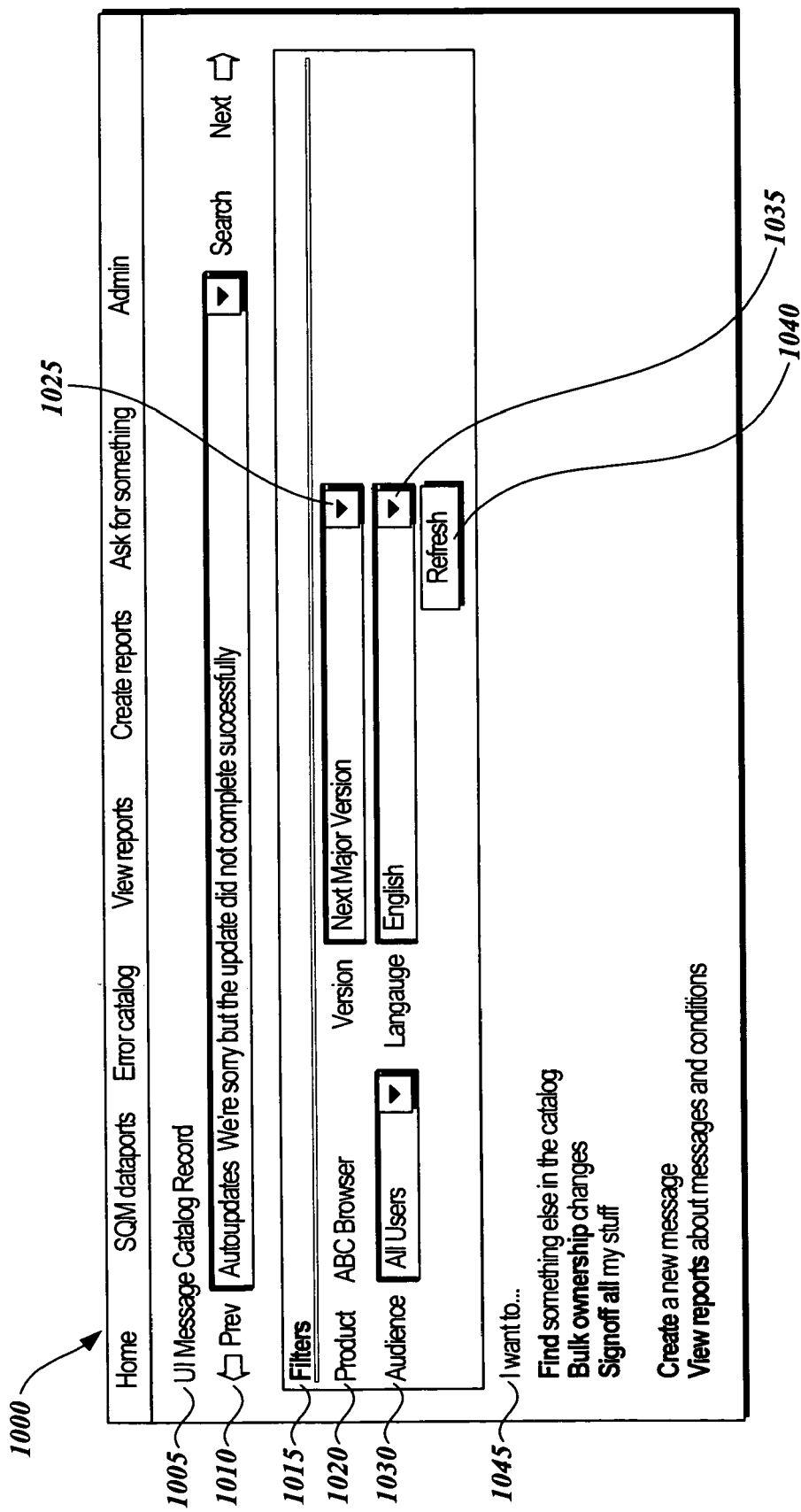

With reference to FIG. 10, the illustrated interface 1000 shows a portion of a message stored on the MC database 105 captioned "UI Message Catalog Record" at reference numeral 1005. The portion of the message displayed at reference numeral 1010 is the example UI message text "Autoupdate: We're sorry but the update did not complete successfully." The text is surrounded by navigational buttons "Prev," and "Next," that allow the user to quickly browse through the various messages. Beneath the displayed portion of the message is a filter section at reference numeral 1015 entitled "Filters." In the illustrated example, the filter section 1015 comprises four selectable input areas in which the user may select the values of certain attributes of the messages that he or she wishes to view, change, or to which new messages are to be added, in this case the attributes of product, version, audience, and language. In the illustrated example, the user has selected to view messages for the "Next Major Version," at reference numeral 1025, of product "ABC Browser," at reference numeral 1020. In addition, the user has selected to view messages for "All Users," at reference numeral 1030, in the "English" language, at reference numeral 1035. A "Refresh" command button, at reference numeral 1040, is provided so that the user may change the filter selections as desired. Of course, it is understood that the attributes of product, version, audience, and language have been chosen for the sake of illustration only, and that other message attributes may be used to filter the view of messages in the MC database 105 in interface 1000. Beneath the filter portion of the interface 1000, navigational links 1045 are provided to allow the user to navigate to other portions of the MC management interface 110, such as an interface to create a new message as shown in FIG. 11. An additional interface for searching for messages to view or edit is described in further detail with reference to FIGS. 6 and 13.

Figure 11:
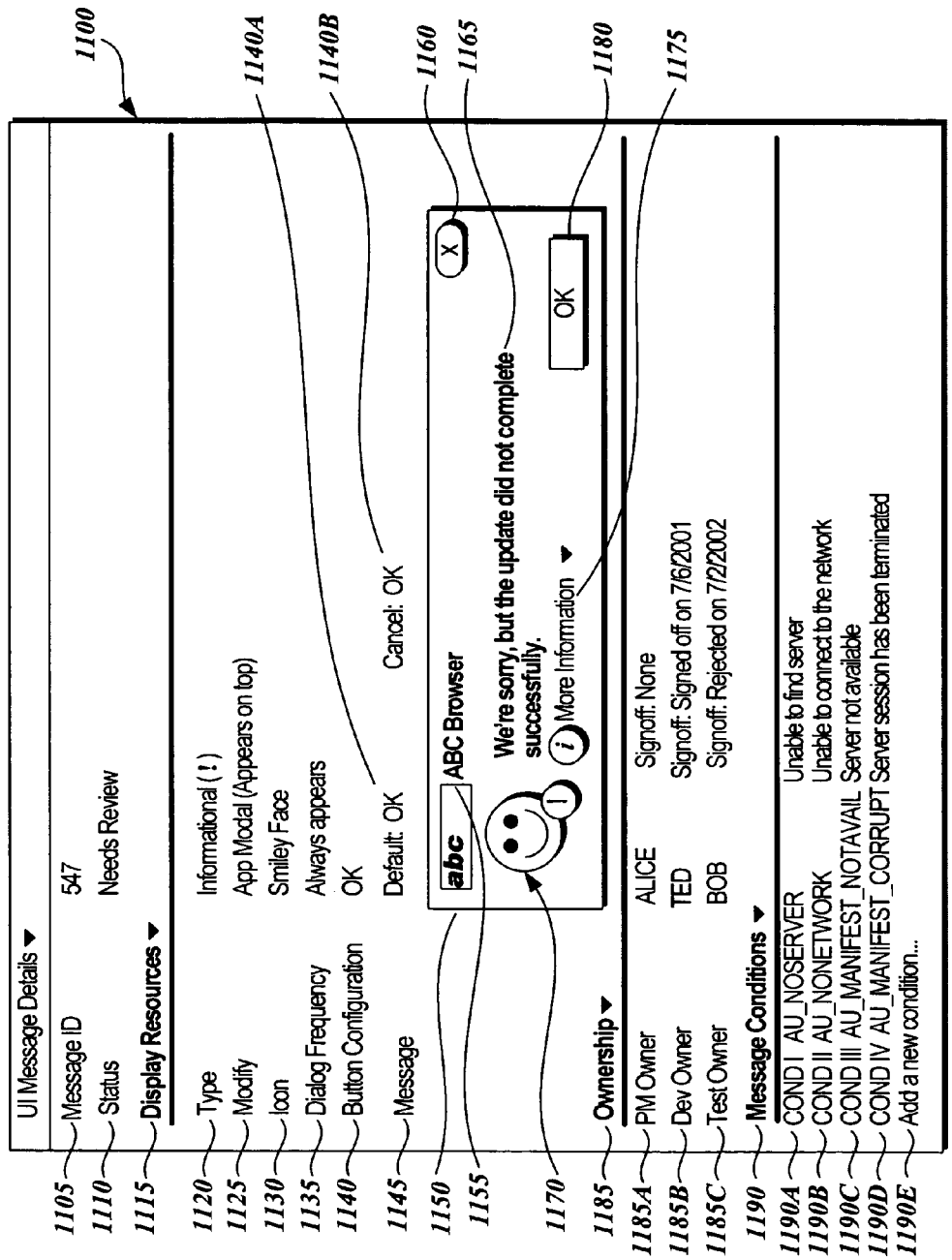

Continuing now with reference to FIG. 11, the illustrated interface 1100 shows detailed information for a UI message stored on the MC database 105 in an graphical user interface captioned "UI Message Details." The details of the UI message is entered or displayed in an interface that includes areas for inputting and/or displaying a Message ID, at reference numeral 1105, here the value "547," and the message Status, at reference numeral 1110, here the value "Needs Review." The UI message interface further includes areas for inputting and displaying the UI message resources, in a section of the interface 1100, here entitled "Display Resources," at reference numeral 1115. In the illustrated example, the UI message resources comprise a message type of "Informational (!)," at reference numeral 1120, a message modality of "App modal (Always on Top)," at reference numeral 1125, a message icon of "Smiley Face," at reference numeral 1130, a message display container frequency of "Always appears," at reference numeral 1135, a message button configuration of "OK," at reference numeral 1140, with the text of the Default and Cancel buttons set to "OK," as shown at reference numerals 1140A and 1140B, respectively, and a display of how the message will appear when displayed using the standard MC display container, at reference numeral 1145. As shown in the illustrated example, the standard MC display container may be a dialog box at reference numeral 1150 that displays a product caption identifying the product in the upper left-hand corner, here shown as "ABC Browser," at reference numeral 1155, a close dialog "X" button in the upper right hand corner, at reference numeral 1160, the message text "We're sorry, but the update did not complete successfully," centered at reference numeral 1165, the message icon to the left of the message text, at reference numeral 1170, the more information link, at reference numeral 1175, which, when activated, will open a display container, such as the illustrated dialog box at reference numeral 1150 to display further details about the message, and an "OK" button, at reference numeral 1180 in the lower right hand corner, to end the dialog for this UI message. It is understood that the message details and standard MC message display container as shown in FIG. 11 are for illustration only, and that other message details and other formats for a message display container may be used in the Display Resources section of the interface 1100 without departing from the scope of the claims that follow.

Continuing with reference to FIG. 11, the UI message interface further includes areas for inputting and displaying the UI message ownership information, in a section of the interface 1100, here entitled "Ownership" at reference numeral 1185. In the illustrated example, the UI message ownership information comprise a "PM Owner," for designating the project management owner at reference numeral 1185A, a "Dev Owner," for designating the developer of the message at reference numeral 1185B, and a "Test Owner," for designating a tester of the message at reference numeral 1185C. To the right of each owner type is displayed a name of the owner followed by an indication of their signoff status, e.g., "None," "Signed off on Jul. 5, 2001," or "Rejected on Jul. 5, 2001."

Continuing with reference to FIG. 11, the UI message interface further includes areas for inputting and displaying the conditions that are associated with the UI message, in a section of the interface 1100, here entitled "Message Conditions" at reference numeral 1190. In the illustrated example, the UI message condition information comprise a "NOSERVER" condition at reference numeral 1190A, a "NONETWORK" condition at reference numeral 1190B, a "MANIFEST_NOTAVAIL" condition at reference numeral 1190C, a "MANIFEST_CORRUPT" condition at reference numeral 1190D, followed by a navigational link captioned "Add a new condition . . . ," at reference numeral 1190E, which, when activated, will allow the user to navigate to another interface for creating a viewing conditions associated with this UI Message such as that described with reference to FIGS. 5 and 12 below.

Returning now to FIG. 4, at process block 420, the MC management interface 110 assigns a next available identification number when adding a new message, referred to here as the message ID. The assigned message ID uniquely identifies the message from among the other messages stored in the MC database 105. At process block 430, the newly created message is associated with a product, including a particular version of a product, as well as an owner, based on the user's inputs as described with reference to FIGS. 10-11. Once the product and owner are associated with the UI message, the MC management interface 110 may further assign certain default values to various attributes of the message, such as setting the Signoff attribute to "NONE" in preparation for a future signoff of the message once the owner review of the UI message is completed.

Continuing now with reference to FIG. 4, at process block 440, the MC management interface 110 receives additional user inputs for the UI message display resources as described with reference to FIG. 11. The additional user inputs include assigned values to the message type, modality, icon, display container frequency, button configuration, etc. as indicated. At process block 450, the MC management interface 110 concludes with updating the UI message status based on the version associated with the UI message and the user input, such as updating the message status to "Needs Review," "Reviewed," and "Final Text," as appropriate. Additional constraints on updating the UI message based on the version associated with the UI message are described in further detail with reference to version control of UI messages in FIG. 8.

Figure 5:
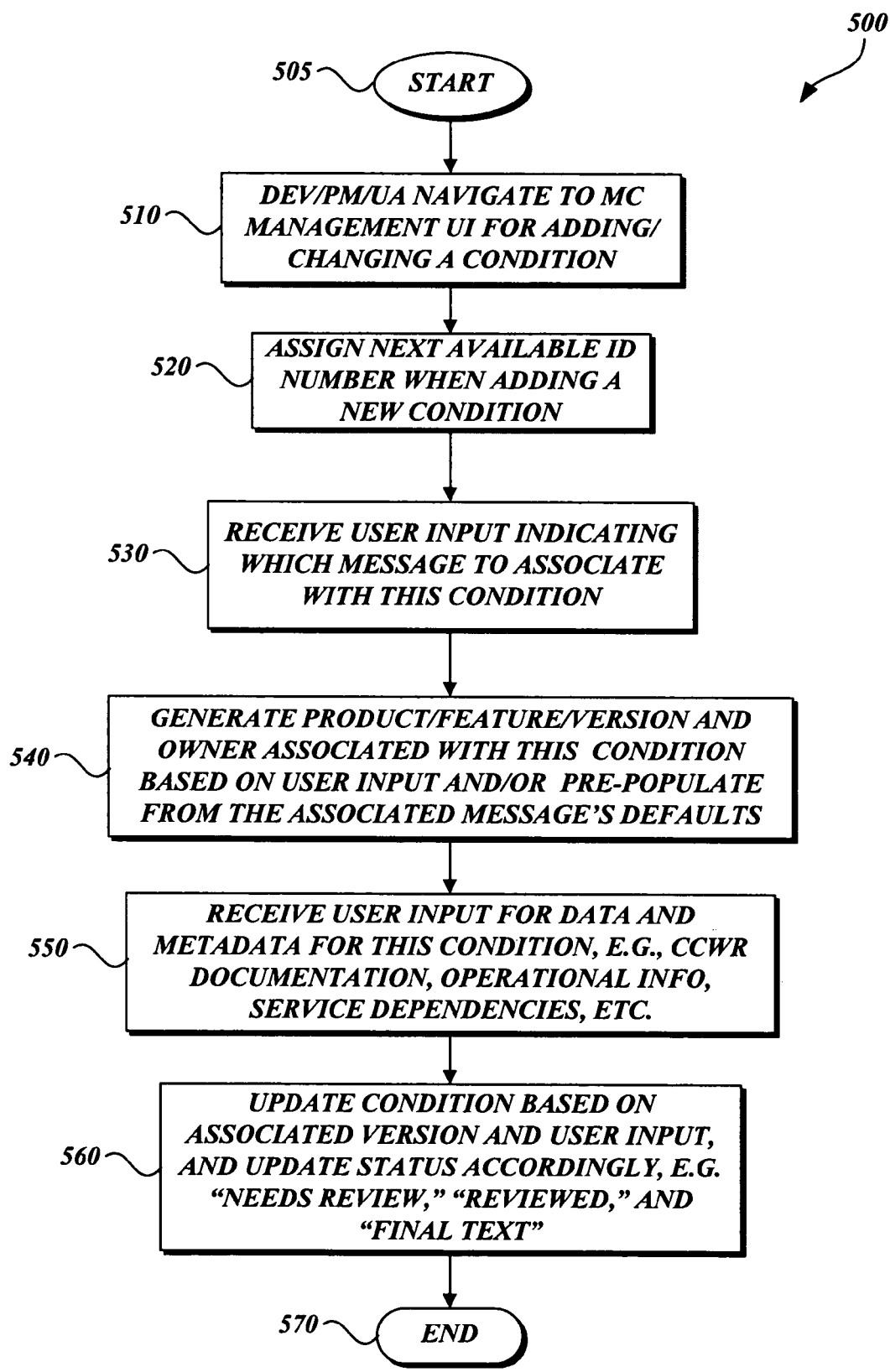

With reference to FIG. 5, a simplified overview of the operational flow 500 of an embodiment of the invention in which a user adds or changes a condition in the MC database 105 using the MC management interface 110. At process block 510, a user of the MC management interface 110, such as a developer, product manager, or user assistance analyst, navigates to a graphical UI of the MC management interface for adding or changing a condition. An example of an MC management UI is illustrated in FIG. 12, at reference numerals 1200.

Continuing now with reference to FIG. 12, the illustrated interface 1200 shows detailed information for a condition stored on the MC database 105 in an graphical user interface captioned "Condition Details." The details of the condition are entered or displayed in an interface that includes areas for inputting and/or displaying a Condition ID, at reference numeral 1205, here the value "COND I," the symbol used for the message, at reference numeral 1210, here the value "AU_NOSERVER," and the message Status, at reference numeral 1215, here the value "Needs Review." The product feature with which the condition is associated is entered or displayed in an area captioned "Features," at reference numeral 1225, having two areas to enter and display a feature and sub-feature, here "AUTO-UPDATE," and "Manifest Download." The expected use of the condition is entered or displayed in an area captioned "Expected Use," at reference numeral 1230, here the value "Dialog." As previously described, the expected use is a value that represents how the developer expects to use the message catalog vis a vis the client API, i.e., whether to generate a standard message catalog display container to report the condition using the UI resources of the associated message in the MC database 105, or whether to simply retrieve the text of the UI message associated with this condition to display in-line in the product's existing UI. The expected use may also indicate whether and/or how to log the condition, regardless of how the condition has been reported, e.g., logging the condition to the user's customer support log or to an instrumentation log. The product dependencies 1235 related to the condition may be displayed and/or entered as local components 1235A, in this example the local browser component named "ABCBROWSER.DLL" and online services 1235B, in this example the online service component named "CLIENT.ABC.COM."

The condition interface further includes areas for inputting and displaying various resources documenting the condition in a section of the interface 1200, here entitled "Documentation," at reference numeral 1240. In the illustrated example, the documentation for the condition comprises both external documentation directed to an external audience, as shown at reference numeral 1245, as well as internal documentation that is reserved for internal use only, as shown at reference numeral 1250. The external audience is shown at reference numeral 1245, and may be selected from a list of various types of user audiences, in this case "All Users." Other choices may include the audience groups previously described with reference to the message catalog schema in Tables 2 and 3. Both the external and internal documentation comprises four text descriptions of the cause, at reference numerals 1260 and 1260A, context, at reference numerals 1265 and 1265A, workaround, at reference numerals 1270 and 1270A, and resolution of the condition, at reference numerals 1275 and 1275A, collectively referred to as the "CCWR."

The condition interface further includes areas for inputting and displaying various operations information about the condition in a section of the interface 1200, here entitled "Operations," at reference numeral 1280. The operations information comprises one or more escalation steps, shown at reference numeral 1285, which document the steps that should be taken by support staff to escalate the response to the condition should the need arise.

Continuing with reference to FIG. 12, the condition interface further includes areas for inputting and displaying the condition ownership information, in a section of the interface 1200, here entitled "Ownership" at reference numeral 1290. Similarly to the UI message interface 1100 illustrated in FIG. 11, the condition ownership information comprises a "PM Owner," for designating the project management owner at reference numeral 1290A, a "Dev Owner," for designating the developer of the condition at reference numeral 1290B, and a "Test Owner," for designating a tester of the condition at reference numeral 1290C. To the right of each owner type is displayed a name of the owner followed by an indication of their signoff status, e.g., "None," "Signed off on Jul. 5, 2001," or "Rejected on Jul. 5, 2001." Additional types of owners are provided for conditions, including a "UA Owner," for designating a user assistance analyst for the condition at reference numeral 1290D, a "PSS Owner," for designating a production support staff member responsible for the condition at reference numeral 1290E, and an "Ops Owner," for designating an operations support staff member responsible for the condition at reference numeral 1290F. Further provided are command buttons captioned "Approve," at reference numeral 1295, and "Reject," at reference numeral 1296.

Returning now to FIG. 5, at process block 520, the MC management interface 110 assigns a next available identification number when adding a new condition, referred to here as the condition ID. The assigned condition ID uniquely identifies the condition from among the other conditions stored in the MC database 105. At process block 530, MC management interface 110 receives user input, such as input that indicates which message in the MC database 105 to associate with this condition. Upon receiving the user input, at process block 540, the MC management interface 110 generates the various attributes of the condition, including the product with which the condition is associated, the feature, the version, the owner, etc. In addition, the MC management interface 110 may pre-populate certain attributes of the condition using the associated message's corresponding values as default values. Alternatively, other or no default values may be used, depending on the implementation. At process block 550, the MC management interface 110 receives additional user input for various other attributes of the condition that comprise the condition's metadata, including the cause, context, workaround and resolution text data, i.e., the CCWR, as well as the operations and service dependency information, all as previously described with reference to the message catalog schema describing the attributes of a condition in Table 3.

Continuing with reference to FIG. 5, at process block 560 the MC management interface 110 concludes with updating the condition and the update status of the condition based on the version associated with the condition as well as the user input, such as updating the message status to "Needs Review," "Reviewed," and "Final Text," as appropriate. Additional constraints on updating the condition based on the version associated with the condition are described in further detail with reference to version control of messages and conditions stored on the MC database 105 in FIG. 8.

Figure 6:
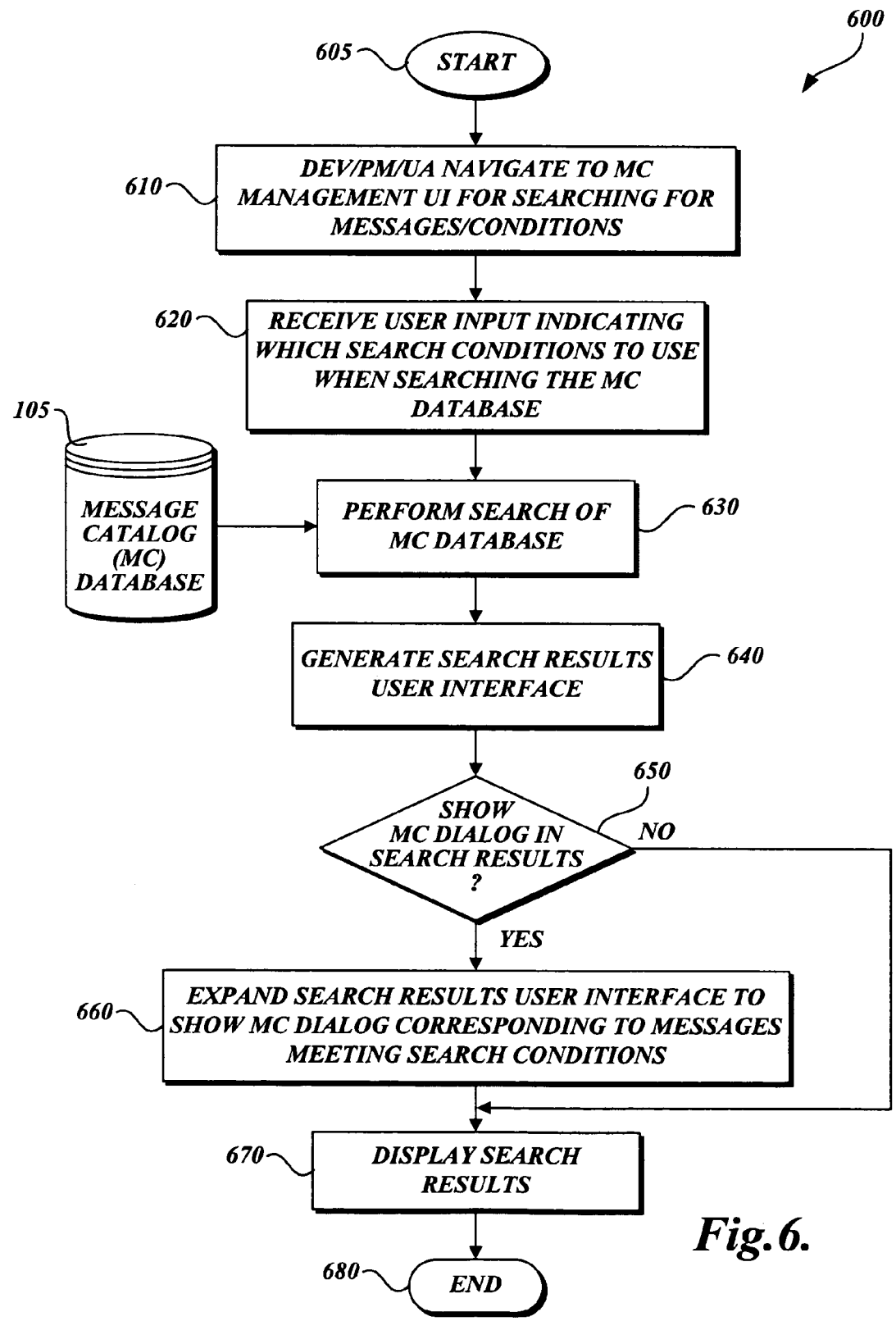

With reference to both FIGS. 5 and 6, when the respective interfaces are used to update messages and conditions stored in the MC database 105, it should be noted that, in a typical embodiment, only owners or members of administrative security groups are authorized to edit the MC database 105 for security reasons. An example of the types of restrictions that could be placed on updating messages and conditions is illustrated in Table 5 below.

TABLE 5

| Owner | What they can change |
|---|---|
| | UI Messages |
| PM Owner | Everything except: Message ID, Owners other than PM, any signoff other than PM |
| Dev Owner | Everything except: the Message ID, Owners other than Dev, any signoff other than Dev |
| UA Owner | Everything except: the Message ID, Owners other than UA, any signoff other than UA |
| | Conditions |
| PM Owner | Everything except: Condition ID, Symbol, Owners other than PM, any signoff other than PM |
| Dev Owner | Everything except: Condition ID, Owners other than Dev, any signoff other than Dev |
| Test Owner | Only: Feature, Sub-feature, CCWR internal, Dependencies, Test Owner, Test Signoff |
| UA Owner | Only: Status, CCWR for all audiences, CCWR internal, Dependencies, UA Owner, UA Signoff |
| PSS Owner | Only: CCWR for all audiences, CCWR internal, PSS Owner, PSS Signoff |
| Ops Owner | Only: CCWR internal, escalation steps, Ops Owner, Ops Signoff |

With reference to FIG. 6, a simplified overview of the operational flow 600 of an embodiment of the invention in which a user searches for messages and conditions in the MC database 105 using the MC management interface 110. At process block 610, a user of the MC management interface 110, such as a developer, product manager, or user assistance analyst, navigates to a graphical UI of the MC management interface for searching MC database 105. At process block 620, the MC management interface 110 receives the user's input indicating which search conditions to use when searching the MC database. An example of an MC management UI for conducting searches of the MC database 105 is illustrated in FIG. 13, at reference numeral 1300.

Continuing now with reference to FIG. 13, the illustrated interface 1300 shows a search interface for searching the MC database 105 in a section of the interface captioned "Search Conditions—You can search the catalog for a specific condition or symbol, run a pre-defined query to return a set of messages, or build your own custom query." As the caption indicates, the MC management interface 110 provides for three types of searches, a search for a particular condition or message, a pre-defined query for one or more conditions and messages, and a custom query for one or more conditions or messages.

Beneath the caption, the illustrated interface 1300 includes selectable search options for specifying which of the three types of searches to conduct, and what, if any, search terms to use. The first search option is an option to look up a specific type of message or condition by condition ID or symbol, at reference numeral 1310. In the illustrated example, the first option is the selected option, specifying the message symbol "AU," which indicates that the search of the MC database 105 should return all of the conditions associated with the message symbol "AU." If there are no messages or conditions with the message symbol "AU," then the search page is redisplayed with the result "No result found." Otherwise, the messages and conditions specifying the message symbol "AU," are displayed in a search results section of the interface 1300, as described below.

In the illustrated example, the next option shown is the unselected option "Use this query," at reference numeral 1315 for specifying a particular query selected from a pull-down list of pre-defined queries. Examples of some of the pre-defined queries that may be provided in a typical embodiment of the search interface include those listed in Table 6.

TABLE 6

| Pre-defined Query | Description of search |
|---|---|
| everything I own for an editable version | All conditions and messages owned in any capacity within a version of the product that is currently marked as editable and not shipped. |
| everything I own for the next major version | All conditions and messages owned in any capacity in the "Next major version" of the product. |
| everything I own in editable versions that are not "Final Text" | All conditions and messages owned in any capacity in the "Next major version" of the product where status is not "Final Text" |
| everything I own that I need to signed-off | All conditions and messages owned in any capacity in a version that is editable where the user hasn't signed off in their capacity(ies) |
| everything I own where I've signed-off but others haven't | All conditions and messages owned in any capacity in a version that is editable where the user has signed-off but some other owner hasn't signed off. |
| everything I own that has incomplete documentation | All conditions owned in any capacity where the Cause Internal and Context Internal fields are null or whitespace. |

In the illustrated example, the next option shown is the unselected option "Custom search in Feature_____ for Version_____" at reference numeral 1320 for specifying a custom search query where the feature and version with which the messages and conditions should be associated are selected from pull-down lists of available features and versions, in this case "All" features in the "Next Major Version." In one embodiment, advanced search options may be provided, including an option to narrow the search request at reference numeral 1325 using a boolean operator at reference numeral 1325A, so that one or more attributes of the messages and conditions equal a particular value. Beneath the search options is included a command button captioned "Search Now" at reference numeral 1330 to initiate the search, and a checkbox at reference numeral 1335 captioned "Show display container user interface in search results," to specify the mode of displaying the search results. Checking the "Show message display container" checkbox will cause the MC management interface 110 to display the search results in a "Show container" mode, i.e., show the message as it would appear using the MC standard display container (e.g., as described in the attributes comprising the UI resources section of the message schema 210 in Table 2).

Returning now to FIG. 6, at process block 630, the MC management interface 110 performs a search of the MC database using the selected search option specified in the interface 1300. At process block 640, the MC management interface 110 generates the search results user interface. As noted above, the search results interface may be displayed in one of two modes, one in which the MC standard UI display container appears in the search results (e.g., a dialog box with the More Info link disabled), and another in which the search results are shown in a table that lists the messages and conditions meeting the specified search option. In both modes, the MC management interface 110 may permit the user to choose one extra column of data to display as part of the search results, an example of which is illustrated in FIG. 13. At decision block 650, the MC management interface 110 determines the mode of display, i.e., whether the user has indicated via the checkbox described above whether to show the display container user interface in the search results. If so, at process block 660, the MC management interface expands the search results user interface to show the MC display containers corresponding to the messages and conditions meeting the specified search option. In either case, the MC management interface 110 displays the search results back to the user that requested them at process block 670.

Returning now to FIG. 13, the illustrated interface 1300 shows a search interface for searching the MC database 105 in a section of the interface captioned "Search Results—Additional information about these messages and conditions is available if you click on the links," at reference numeral 1340. As the caption indicates, and as shown in the illustrated example, in one embodiment, the MC management interface 110 displays the search results in a mode that displays the messages and conditions that meet the selected search option in a table at reference numeral 1345. As shown, the table header for some of the columns of the table includes selectable columns that allow the user to select the attribute of the message or condition they would like to view in that column. If the selectable column follows the message column, then the selectable column may display only message attributes. Likewise, if the selectable column follows the condition column, then the selectable column may display only condition attributes.

In the illustrated search results example, at least four attributes of the messages and conditions returned to the search results section are shown, including the UI Message text, the message status, the condition codes and symbols, and the condition's project manager owner. The first message returned to the search results section is "We're sorry but the update did not complete successfully," shown at reference numeral 1350, has a status of "Needs Review," and is associated with five conditions, "COND I AU_NOSERVER," "COND II AU_NONETWORK," "COND III AU_MANIFEST_NOTAVAIL," all of which are owned by project manager "ALICE." The first message is also associated with "COND IV AU_MANIFEST_CORRUPT," owned by project manager "TED," and "COND V AU_MANIFEST_NOCHEXKSUM," owned by project manager "BOB." The next message returned to the search results section is "We're sorry but the update did not complete successfully. Please try again later," has a status of "Final Text," and is associated with two conditions "COND VI AU_NOSERVER," "COND VII AU_NONETWORK," both of which are owned by project manager "Alincoln." The last message returned to the search results sections is "I am a dialog message, what are you?" shown at reference numeral 1360, has a status of "Needs Review," and is associated with five conditions, "COND I AU_NOSERVER," "COND II AU_NONETWORK," "COND III AU_MANIFEST_NOTAVAIL," all of which are owned by project manager "ALICE," "COND IV AU_MANIFEST_CORRUPT," owned by project manager "TED," and "COND V AU_MANIFEST_NOCHEXKSUM," owned by project manager "BOB."

In one embodiment, the user may be able to select the messages or conditions for viewing and/or editing. For example, if editing is allowed, an "edit icon" (e.g., a pencil) may be displayed next to the message or condition. Clicking on this edit icon will take the user to an viewing and editing interface for that message or condition, examples of which were described with reference to FIGS. 11 and 12. With reference to FIG. 13, the edit icon is represented as a pencil appearing to the left of the message or condition that can be edited. For example, as shown, the first and third message, at reference numerals 1350 and 1360, may be edited since they have not reached the "Final Review" status, whereas the second message, at reference numeral 1355, may not.

Beneath the search results portion of the interface 1300, navigational links 1365 may be provided to allow the user to navigate to other portions of the MC management interface 110, such as an interface to create a new message as shown in FIG. 11.

Figure 7:
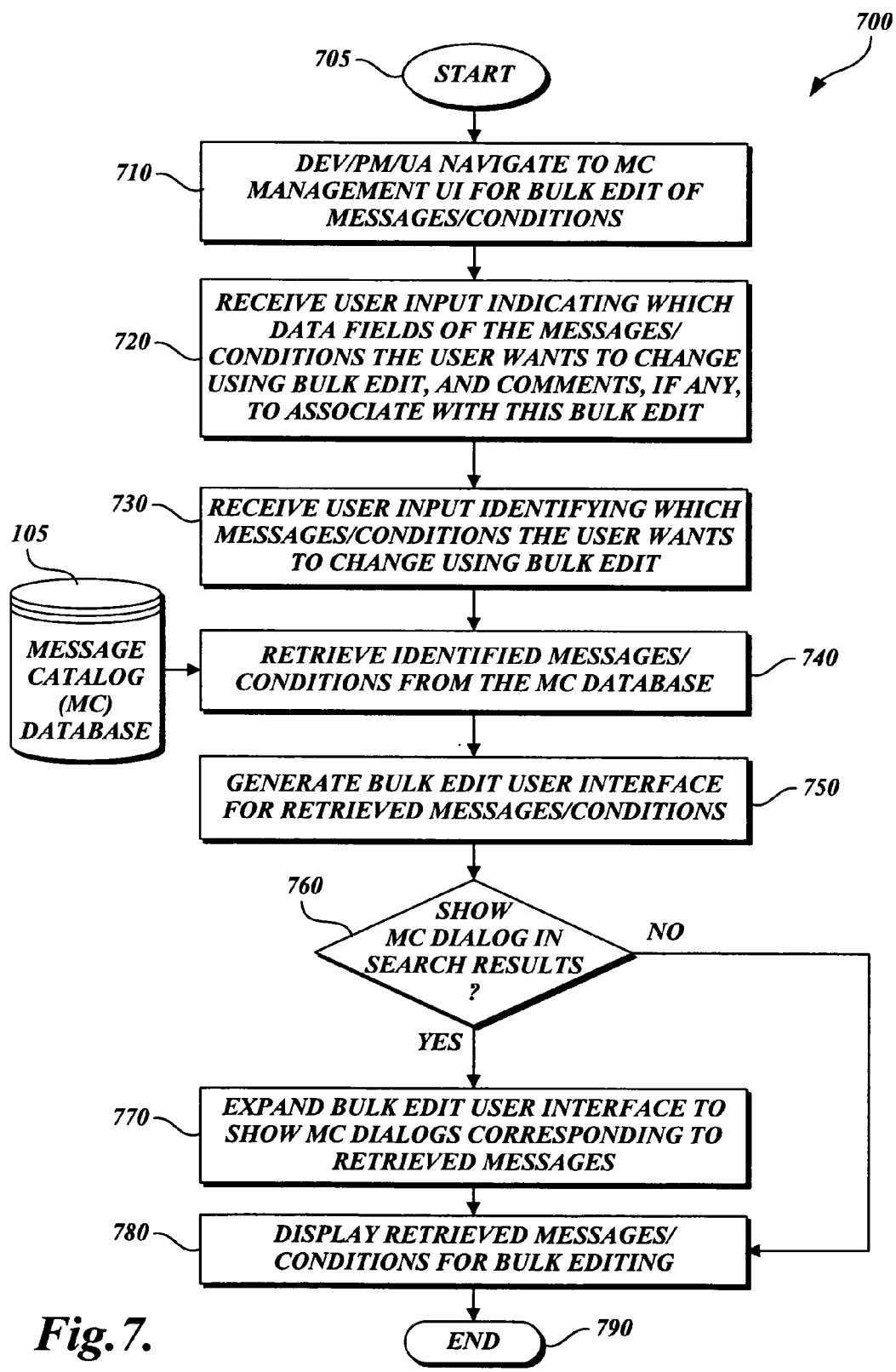

Turning now to FIG. 7, a simplified overview of the operational flow 700 of an embodiment of the invention in which a user performs bulk edits of messages and conditions in the MC database 105 using a bulk edit user interface of the MC management interface 110. Since a single user could own thousands of messages and conditions that they need to manage or signoff the MC management interface 110 provides a bulk editing mechanism that allows users to globally edit groups of messages and conditions with the same change. At process block 710, a user of the MC management interface 110, such as a developer, product manager, or user assistance analyst, navigates to a graphical UI of the MC management interface for bulk editing messages and conditions stored in the MC database 105. An example of an MC management UI for conducting bulk edits of messages and conditions in the MC database 105 is illustrated and described with reference to FIG. 14 below. At process block 720, the MC management interface 110 receives user input indicating which data fields, i.e. which attributes, of the messages and conditions that the user wants to change, and comments, if any, to associate with this bulk edit. In a typical embodiment, for security reasons, only certain attributes may be permitted to be bulk edited, such as the ownership and signoff status.

At process block 730, the MC management interface 110 receives user input identifying which messages and conditions the user wants to change using bulk editing. In a typical embodiment, the MC management interface 110 will initialize the display of the bulk edit interface with all of the messages and conditions that the user is allowed to edit, e.g. all of the messages and conditions that he or she owns, from which display the user may select all or particular messages and conditions to bulk edit. Once the selection is received, the MC management interface 110, at process block 740, retrieves the selected records from the MC database 105 and, at process block 750, generates the bulk edit interface for the retrieved messages and conditions. At decision block 760, the MC management interface 110 determines which mode of display the user has selected, i.e., whether to show the MC standard display container used to display the message, or just the message and associated conditions in a table format. At process block 770, the MC management interface 110 expands the bulk edit user interface to show the MC display containers corresponding to the retrieved messages when that mode has been selected. In either mode, the MC management interface 110 then proceeds, at process block 780, to display the retrieved messages and conditions for bulk editing.

Continuing now with reference to FIG. 14, the illustrated interface 1400 shows a bulk edit interface for editing groups of messages and conditions in the MC database 105 in accordance with the operational flow just described with reference to FIG. 7. Similar to the search interface described in FIG. 13, the bulk edit interface 1400 comprises a top section to specify the bulk edit options, beneath which appears a table that lists the messages and associated conditions that the user owns, all or selected ones of which may be edited using the bulk edit interface. The top section of the interface is captioned at reference numeral 1405 "What do you want to change? Making bulk changes in the catalog is simple. Just specify what you want to change, a brief comment, and then select the items that should receive these changes in the list of things you own below. NOTE" Once you save these changes only an administrator ca back them out, so be careful." As the caption indicates, the MC management interface 110 provides the user with the ability to make bulk changes to all of the messages and conditions that he or she owns.

Beneath the caption of the top section, the illustrated interface 1400 includes selectable bulk edit options for specifying what the user wants to change. The first bulk edit option is an option to re-assign their ownership to another user. In the illustrated example, the first option, at reference numeral 1410, is the selected option, specifying "Re-assign my ownership to BOB," which indicates that all of the records for the current user, for example user "Alice," are now to be associated with the owner "BOB." The next bulk edit option shown is the unselected option "Sign off as Approved," at reference numeral 1415 for specifying a bulk sign off for all or selected ones of the messages that a user owns. The third bulk edit option is the unselected option "Set the status to "Final Text," at reference numeral 1420, for specifying a bulk status update of messages to the Final Text stage, indicating that the text is no longer editable. In each of the last two options, the selection of "Approved" and "Final Text" may be varied to suit the user's needs, e.g., "Rejected" or "Needs Review" might be specified instead. The last option, shown at reference numeral 1425, is "Delete them," specifying that all of the selected messages should be deleted. At reference numeral 1430, an input area is provided with the instructions "Please explain why you are making this change," for the user to enter a comment explaining the reason for the bulk edit. In this example the user has entered the comment "Current owner is transferring to a new job," to explain the reason for changing the ownership to "Bob." Beneath the bulk edit options is included a command button captioned "Save Changes" at reference numeral 1435 to initiate the specified bulk edit changes.

Beneath the top sections of the bulk edit interface is a section at reference numeral 1440 captioned "What records are you changing? The following is the current list of stuff that you own in the catalog. Please select the items that should receive these changes." As the caption indicates, and as shown in the illustrated example, in one embodiment, the MC management interface 110 displays the messages and conditions that the user owns in a table at reference numeral 1455. Similar to the table in the search results section of the interface described with reference to FIG. 13, the table header for at least one of the columns of the table includes a selectable column that allow the user to select the attribute of the message or condition they would like to view in that column. In this example, the selectable column is shown with the selection "How Owned." Three messages and associated conditions are listed in the table, similar to that described for the search results interface in FIG. 13. Selection check boxes are provided next to each of the messages and/or conditions, shown at reference numerals 1460, 1465, and 1470, that may be selected for bulk edit. Alternatively, the user may select all of the messages and conditions using the "Select everything" option appearing above the table at reference numeral 1445. Once selected, the user activates the Save Changes button at reference numeral 1435 to apply the bulk edit changes to the selected messages and conditions.

Beneath the bottom portion of the interface 1400, navigational links 1475 may be provided to allow the user to navigate to other portions of the MC management interface 110, such as an interface to find a specific record as shown in the search interface in FIG. 13.

Figure 8:
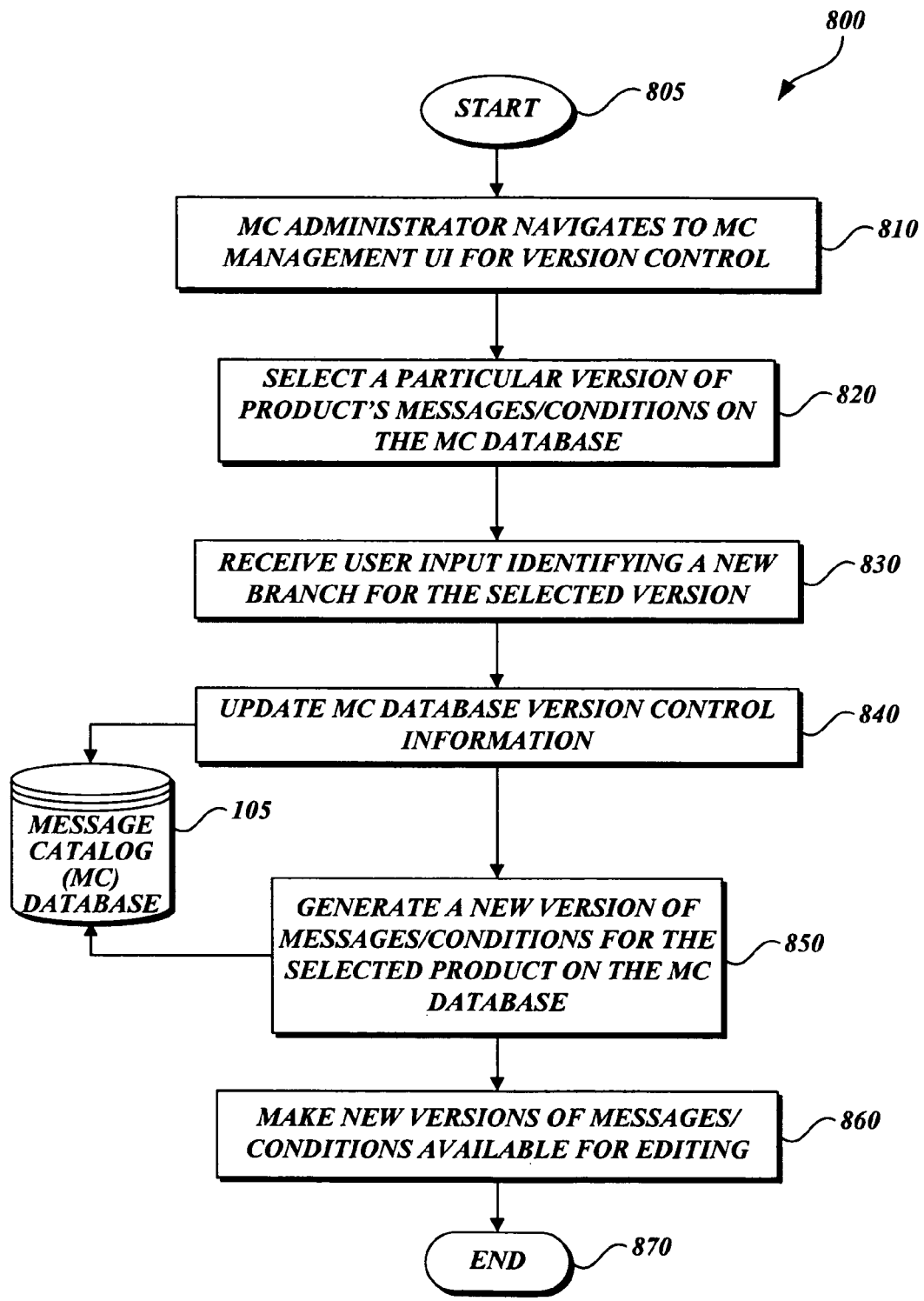
FIG. 8 is another flow diagram illustrating version control aspects of the logic performed by a method to facilitate editing messages and conditions stored in the message catalog in conjunction with the system illustrated in FIGS. 1 and 2, and in accordance with an embodiment of the present invention.

Turning now to FIG. 8, which is flow diagram illustrating version control aspects of the logic performed by a method to facilitate editing messages and conditions stored in the message catalog in conjunction with the system illustrated in FIGS. 1 and 2, and in accordance with an embodiment of the present invention. As noted previously, the MC database 105 employs version control so that users can edit messages and conditions for a QFE independently from the messages and conditions being created for the next major release. To version the MC database 105, the MC management interface tags a "version" of the UI message or condition to the versions of the product to which the messages and conditions apply. An example of versions of messages and conditions was previously described with reference to Table 1.

To add new versions of messages and conditions to the MC database 105, at process block 810 and 820, an administrator of the MC database 105 optionally navigates to an MC management UI for version control to select an existing version of a product's on the MC database 105 as described, for example, with reference to the message catalog product/version schema 250 as previously set forth in detail in Table 4. At process blocks 830 and 840, the MC management interface 110 receives user input from the administrator identifying a new branch for the existing version and updates the MC database 105 with the new branch by creating the new product/version control data for that product in accordance with the message catalog product/version control schema 250. In particular, the new product/version control data includes an indication of whether the UI messages are editable, and whether this version of the product has been shipped. A summary of what attributes of messages and conditions may be edited using version control appears in Table 7.

TABLE 7

| UI Message Editable? | Shipped? | What may be edited: |
|---|---|---|
| Yes | No | Anything can be edited. This is the state for all messages and conditions associated with versions under development. |
| No | Yes | This is the state for shipped versions. Only meta-data on the messages and conditions may be edited, e.g., owners, Ops Escalation, Documentation (Cause, Context, Workaround, Resolution) Public and Internal |
| No | No | This may occur when a product is in lock-down for that version. Only meta-data may be edited, e.g.owners, Ops Escalation, Documentation, (Cause, Context, Workaround, Resolution) Public and Internal |
| Yes | Yes | The MC management interface will block any changes to the messages and conditions on the MC database, as changes to the UI message's text after a version has shipped is not permitted |

At process block 850, the MC management interface 110 generates a new version of the messages and conditions for the product by generating copies of the messages and conditions associated with the existing version of the product, and associating the copies with the new branch, i.e., "tagging," the messages and conditions to the product version control data that was just created for the new version. The process concludes at process block 860, where the MC management interface 110 makes the new versions of the messages and conditions available for editing in accordance with the restrictions set forth in Table 7.

Figure 9:
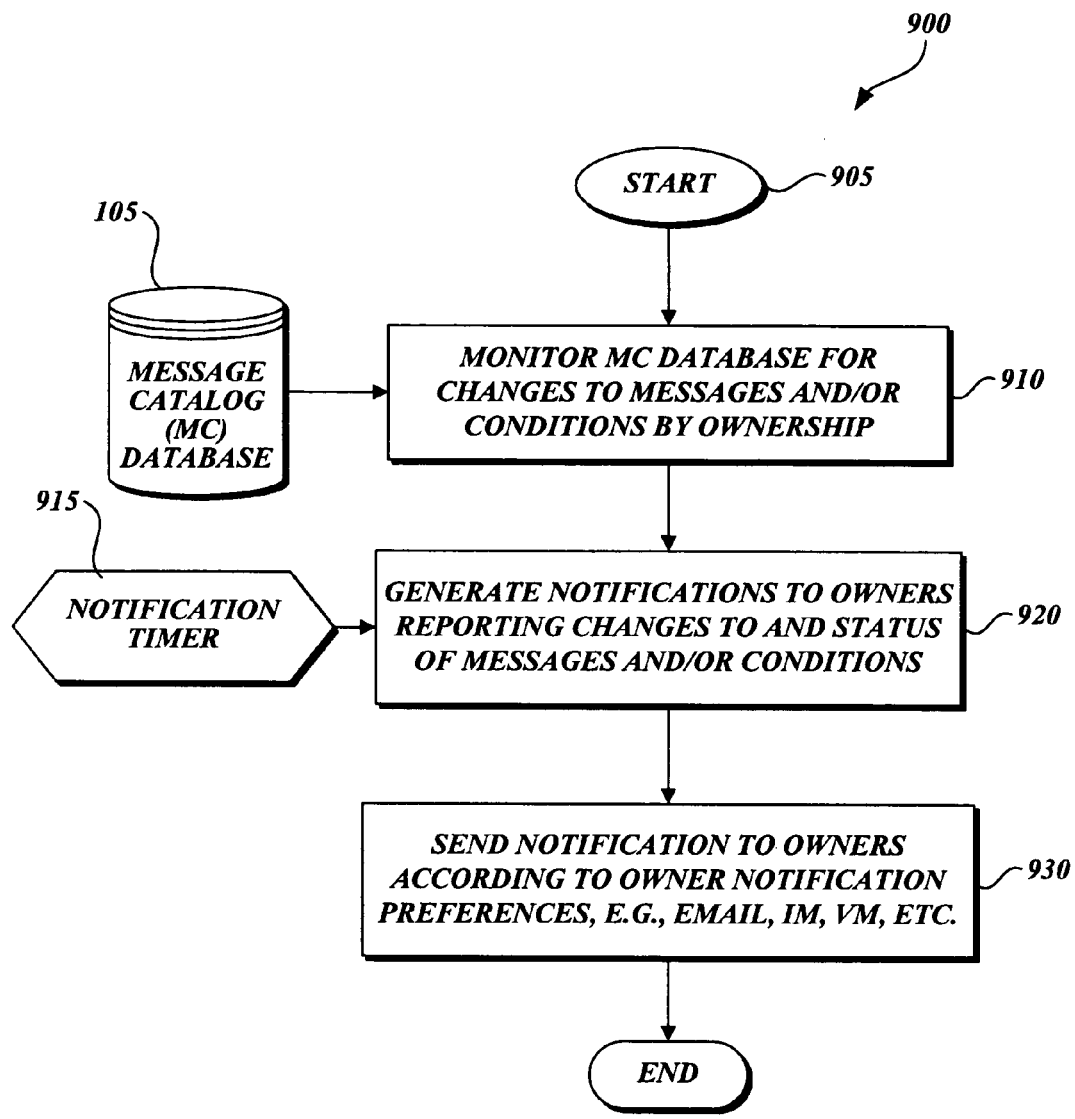
FIG. 9 is another flow diagram illustrating notification aspects of the logic performed by a method to facilitate storing and managing messages and conditions stored in the message catalog in conjunction with the system illustrated in FIGS. 1 and 2, and in accordance with an embodiment of the present invention.

FIG. 9 is a flow diagram illustrating notification aspects of the logic performed by a method to facilitate storing and managing messages and conditions stored in the message catalog in conjunction with the system illustrated in FIGS. 1 and 2, and in accordance with an embodiment of the present invention. An important improvement in the method for facilitating the management of messages is making sure that those responsible for the messages and associated conditions are well informed about their status and any changes that may have been made. To that end the MC management interface 110 provides users with notifications about changes that were made to messages and conditions for which they are responsible, and, periodically, with notifications summarizing their status.

With reference to FIG. 9, at process block 910, the MC management interface monitors the MC database 105 for any changes to messages and/or conditions that a user may own, or that are related to messages and/or conditions that a user may own, e.g., a UI message that the user doesn't own, but is the UI message for a condition that they do own. Similarly, at process block 920, the MC management interface 110 provides a notification timer 915 that may be set to trigger the generation of notifications at regular intervals to users reporting changes to or the status of messages and conditions that they own, or that are related to messages and/or conditions that they own, Such intervals may be determined by the user or may be preset for a particular product or version, such as bi-weekly, monthly, etc. At process block 930, the MC management interface 110 sends the generated notification to the appropriate users, according to their notification preferences, e.g. via email, instant message, voicemail, etc.

FIGS. 15 and 16 illustrate two examples of the types of notifications that may be generated by the MC management interface. The first example illustrated in FIG. 15 is that of a change email that informs owners about the changes made to messages and conditions of interest. Change notifications are generated on a daily basis and are typically only sent when changes are made to a message or condition that the user owns, or a message that the user does not own, but is the UI message for a condition that the user does own. In the illustrated example, the change mail was generated for messages and conditions for the ABC Browser product that are owned by the ABC Browser product manager. As shown, the messages and conditions are listed in a table format that lists the changes made to individual messages and conditions.

In one embodiment, the text that appears in each row of the table may be a hyperlink that, when activated, navigates to the current version of that message or condition. The table lists the status and other attributes of the message or condition whose value changed since the last change notification was sent. For example, in the illustrated embodiment of the notification, if the number of changed fields is greater than five (5) then the notification indicates a change status of "Major Changes". If a new condition has been created the change status should be "Created," whereas new versions or branches of the message or condition report the status as "Version." Particular attributes whose state is always listed in the table include the status and signoff attributes.

The second example of a notification is illustrated in FIG. 16 showing a status email that informs owners about the status of messages and conditions of interest. In particular, the status email provides the user with a high-level summary of their messages and conditions and allows them to drill into the MC management interface to learn more. In a typical embodiment, the status email may be sent automatically to all owners on the 1st and the 15th of every month, however the frequency may vary from one product to another or may be varied to suit the owners' preferences. In the illustrated example, the status email was generated for messages and conditions for the ABC Browser product that are owned by the ABC Browser product manager.

In a typical embodiment, the messages and conditions are listed in a table format that lists the status of messages and conditions by version. In the illustrated embodiment the text of the columns may be a hyperlink that, when activated, navigates to the MC management search user interface, and executes a search that would return the messages and conditions that are reported in the notification. Similarly, if the user clicks on any of the lines in the status column, they may be linked to the MC management search user interface, whereupon the interface executes a search for those messages and conditions having that status.

In one embodiment, the status notification reports on conditions where Cause Internal, or Context Internal are null or white space, where the owner has yet to sign off, or where the owner receiving the notification has signed off, but not all of the other owners have signed off. If no conditions meet the notification criteria, then the reported status is "No problems detected."

In one embodiment, the status notification reports on messages where the message's status is not "locked," where the owner has yet to sign off, or where the owner receiving the notification has signed off, but not all of the other owners have signed off. If no messages meet the notification criteria, then the reported status is "No problems detected."

While the presently preferred embodiments of the invention have been illustrated and described, it will be appreciated that various changes may be made therein without departing from the spirit and scope of the invention. For example, in one embodiment of the present invention, the various components of the system 100 to facilitate managing UI messages and, in particular, the functionality of the various system components as described with reference to the message catalog schema 200, may be implemented in different combinations of processes, programs, or interfaces, and may be distributed across one or more computing devices.

Moreover, the system 100 to facilitate managing UI messages has been described in the general context of a personal computer usable in a distributed computing environment, where complementary tasks are performed by remote computing devices linked together through a communication network. However, those skilled in the art will appreciate that the invention may be practiced with many other computer system configurations, including multiprocessor systems, minicomputers, mainframe computers, and the like. In addition to the more conventional computer systems described above, those skilled in the art will recognize that the invention may be practiced on other computing devices including laptop computers, tablet computers, personal digital assistants (PDAs), and other devices upon which computer software or other digital content is installed.

For the sake of convenience, much of the description of the computing system suitable for implementing various features of the invention includes numerous references to the Windows operating system and UI messages generated by computer software products such as browser software. However, those skilled in the art will recognize that such references are only illustrative and do not serve to limit the general application of the invention. For example, the invention may be practiced in the context of other operating systems, such as the LINUX operating system, and in the context of other types of computer software products that provide UI messages, or any other type of message, in response to various events and conditions that occur during use of the product.

Lastly, while aspects of the invention have been described in terms of schemas, databases, records, interfaces, etc., executed or accessed by an operating system in conjunction with a personal computer, those skilled in the art will recognize that those aspects also may be implemented in combination with various other types of program modules or data structures. Generally, program modules and data structures include routines, subroutines, programs, subprograms, methods, interfaces, processes, procedures, functions, components, schema, etc., that perform particular tasks or implement particular abstract data types.

The embodiments of the invention in which an exclusive property or privilege is claimed are defined as follows:

1. A method for managing compilable user interface messages that appear on the display of a computer system that is network connectable to one or more other computer systems via a network using a user interface ("UI") message catalog, the method comprising:

creating message data in said UI message catalog, the UI message data describing resources used to manage and track the development of a UI message, including resources used to display the UI message to a user of a compiled software application program with which the UI message is associated;

creating condition data in the UI message catalog, the condition data describing at least one condition for which the UI message is displayed to the user of the compiled software application program, wherein the condition data is searchable such that a user can search the UI message catalog for UI messages associated with the condition data by inputting a search conditions attribute for a pre-defined or custom search of the UI message catalog, wherein the condition data further describes documentation data associated with the condition, the documentation data including at least one of a cause of the condition, a context of the condition, a workaround for the condition, and a resolution of the condition, and wherein the documentation data further includes at least one of a message ID identifying the UI message that is displayed when the condition occurs, a code symbol of the identified UI message, a feature of the compiled message-enabled software application program for which the condition occurs, a sub-feature of the software application program for which the condition occurs, a documentation status of the documentation data that is publicly available to the user of the compiled message-enabled software application program, an expected use of the UI message catalog when the condition occurs, a dependency list identifying one or more services and components that might cause the condition, an escalation identifying at least one of an alias to which occurrences of the condition should escalate, and an action to take when the condition occurs;

compiling the UI message catalog into a format suitable for enabling the UI message to be merged with the compiled software application program to create a compiled message-enabled software application program;

merging the UI message from the UI catalog with the compiled software application program to create the compiled message-enabled software application program wherein said merging occurs before runtime of said compiled message-enabled software application program; and displaying the UI message to the user when the at least one condition occurs during use of the compiled message-enabled software application program, wherein displaying is performed using the resources described in the UI message data.

2. The method as recited in claim 1, wherein the UI message data describes an audience to which the user of the compiled message-enabled software application program belongs, and further comprising localizing the UI message and condition data to at least one of a level of expertise and a language of the audience.

3. The method as recited in claim 2, wherein localizing the UI message and condition data to the level of expertise of the audience includes changing the resources used to display the UI message to the user.

4. The method as recited in claim 2, wherein localizing the UI message and condition data to the language of the audience includes translating a text portion of the resources used to display the UI message to the user to the language of the audience.

5. The method as recited in claim 1, wherein the resources used to develop the UI message includes a status of the UI message and an owner of the UI message, and the condition data further describing a status of the condition, and an owner responsible for the condition.

6. The method as recited in claim 5, further comprising notifying the owners about their UI messages and conditions.

7. The method as recited in claim 6, wherein notifying the owners about their UI messages and conditions is performed when the UI message and condition data changes.

8. The method as recited in claim 6, wherein notifying the owners about their UI messages and conditions is performed periodically.

9. The method as recited in claim 6, wherein notifying the owners about their UI messages and conditions is performed when the status of the UI message and the status of the condition indicate that the owners have not yet approved their UI messages and conditions.

10. The method as recited in claim 1, further comprising:
locking the UI message and condition data in the UI message catalog after the owners have approved, wherein the locked UI message and condition data can no longer be edited; and
branching the UI message data and condition data in the UI message catalog for use with a new version of the compiled message-enabled software application program, wherein the branched data can be edited to reflect any changes in at least one of the UI message displayed to the user of the new version of the compiled message-enabled software application program, and the conditions for which the UI message is displayed.

11. The method as recited in claim 1, wherein the resources used to display the UI message to the user of the compiled message-enabled software application program include at least one of a UI message catalog display container representing the UI message as one of an error, a question, and informational, a text of the tJ1 message to display in the UI message catalog display container, an icon to display in the UI message catalog display container, a button configuration for the UI message catalog display container, a message parameter representing parameters passed for the UI message, and a show again indicator of whether to display a show again user option in the UI message catalog display container.

12. The method as recited in claim 1, wherein the documentation data is publicly available to the user of the compiled message-enabled software application program.

13. The method as recited in claim 1, wherein the documentation data is privately available to the user of the compiled message-enabled software application program.

14. The method as recited in claim 1, the documentation data further including an expected use, the expected use indicating whether to display the UI message using the UI message catalog display container or in-line.

15. The method as recited in claim 14, wherein the expected use further indicates whether to log the UI message to a support repository.

16. A method for displaying on a display device of a computer system an interface to a user interface ("UI") message catalog in which UI message data for compiled software application programs are stored, the method comprising:
receiving an input for creating a UI message, the UI message input specifying at least one condition for which the UI message is displayed to a user and at least one resource for developing the UI message, the at least one resource for developing the UI message including at least one resource for displaying the UI message;
storing the UI message in a UI message catalog in a format that enables the UI message to be merged with the compiled software application program to create a compiled message-enabled software application program in response to receiving the user UI message input, wherein said merging occurs before runtime of said compiled message-enabled software application program;
receiving an input for creating a condition, the condition input including condition data that specifies the UI message to display to the user when the condition occurs, an expected use for the condition, and a documentation of the condition, wherein the condition data further specifies documentation data associated with the condition, the documentation data including at least one of a cause of the condition, a context of the condition, a workaround for the condition, and a resolution of the condition, and
wherein the documentation data further includes at least one of a message ID identifying the UI message that is displayed when the condition occurs, a code symbol of the identified UI message, a feature of the compiled message-enabled software application program for which the condition occurs, a sub-feature of the software application program for which the condition occurs, a documentation status of the documentation data that is publicly available to the user of the compiled message-enabled software application program, an expected use of the UI message catalog when the condition occurs, a dependency list identifying one or more services and components that might cause the condition, an escalation identifying at least one of an alias to which occurrences of the condition should escalate, and an action to take when the condition occurs;
storing the condition in a UI message catalog in response to receiving the condition input;
receiving an input for bulk editing at least one UI message stored in the UI message catalog for the compiled message-enabled software application program, wherein the one or more UI messages are edited at the same time by the input, and wherein UI messages are bulk edited without changing prior existing versions of the UI messages;
compiling the UI message catalog into a format that is accessible to the compiled message-enabled software application program; and
displaying the UI message and any conditions for which the UI message is displayed to the user.

17. The method as recited in claim 16, further comprising:
receiving an input for associating the UI message and any condition for which the UI message is displayed with a version of a compiled message-enabled software application program, the version including one of an editable version and a non-editable version, the non-editable version representing a version of the compiled message-enabled software application program that has shipped.

18. The method as recited in claim 16, wherein the UI message input specifying at least one resource used to develop the UI message includes UI message input specifying a status of the UI message and an owner of the UI message, and the condition input further specifying a status of the condition, and an owner responsible for the condition.

19. The method as recited in claim 16, further comprising:
receiving an input for querying the UI message catalog to display those UI messages and conditions associated with one of the versions of the compiled message-enabled software application program.

20. The method as recited in claim 16, further comprising:
receiving an input for querying the UI message catalog to display those UI messages and conditions associated with editable versions of the compiled message-enabled software application program.

21. The method as recited in claim 16, further comprising:
receiving an input for querying the UI message catalog to display the conditions that occur most frequently.

22. The method as recited in claim 17, further comprising:
receiving an input for querying the UI message catalog to display the UI messages owned by a particular owner.

23. The method as recited in claim 17, further comprising:
receiving an input for querying the UI message catalog to display the conditions owned by a particular owner.

24. The method as recited in claim 16, further comprising:
receiving an input for updating the UI message catalog to edit the UI message and any conditions;
rejecting the updating input when the version with which the UI message and any conditions are associated is non-editable; and
updating the UI message catalog in accordance with the updating input when the version with which the UI message and any conditions are associated is editable.

25. The method as recited in claim 16, further comprising:
receiving an input for documenting a condition, the documenting input specifying at least one of a cause, condition, workaround, and resolution (CCWR) of the condition; and
displaying the CCWR of the condition.

26. The method as recited in claim 17, further comprising:
receiving an input for approving the UI message, the approving input specifying whether to update the UI message status to indicate one of whether the UI message needs review, whether the UI message has been reviewed, and whether the text of the UI message has been finalized.

27. The method as recited in claim 17, further comprising:
receiving an input for approving the condition, the approving input specifying whether to update the condition status to indicate one of whether the UI message needs review, whether the UI message has been reviewed, and whether the text of the UI message has been finalized.

28. The method as recited in claim 16, further comprising:
displaying the UI messages and conditions for the bulk edit that has been requested;
receiving a selection of a subset of the UI messages and conditions for the bulk edit that has been requested, including a default selection of all of the UI messages and conditions for the bulk editing that has been requested; and
updating the selected UI messages and condition with the specified global change.

29. The method as recited in claim 28, wherein the bulk edit is restricted to one of reassigning the selected UI messages and conditions to a new owner, approving the selected UI messages and conditions, updating the status of the selected UI messages and conditions, and deleting the selected UI messages and conditions.

30. The method as recited in claim 16, wherein the at least one resource for displaying the UI message include at least one of a UI message catalog display container representing the UI message as one of an error, a question, and information, a text of the UI message to display in the UI message catalog display container, an icon to display in the UI message catalog display container, a button configuration for command buttons in the UI message catalog display container, a UI message parameter representing parameters passed for the UI message, and a show again indicator of whether to display a show again user option in the UI message catalog display container.

31. A computer storage medium having stored thereon a compilable data structure representing a user interface ("UI") message suitable for appearing on the display of a computer system that is network connectable to one or more other computer systems via a network, the data structure comprising:
a compiled message-enabled software application program attribute representing a compiled message-enabled software application program for which a UI message has been created in a merger prior to runtime of said compiled message-enabled software application;
a version attribute indicating that a version of the compiled message-enabled software application program to which the U1 message pertains;
a language attribute indicating a dominant language of a user audience to whom the UI message is displayed;
an audience attribute indicating a selected one of a type of user audience to whom the UI message is displayed, the type of user audience including a level of expertise of the user audience;
an ID attribute uniquely identifying the UI message;
a type attribute indicating whether the UI message is displayed using one of an error display container, a question display container, and an informational display container;
a status attribute indicating a status of the UI message, the status indicating one of whether the message needs review, whether the message has been reviewed, and whether the text of the message has been finalized;
a modality attribute indicating a modality of the display container used to display the UI message, the modality being one of displaying the display container always on top or beneath another window;
an icon attribute identifying an icon to display in the display container used to display the U1 message;
a show again indicator of whether the display container used to display the UI message includes a user option to not display the message again;
a text attribute containing a text of the UI message;
a parameter attribute containing a description of parameters passed for the UI message from the compiled message-enabled software application program for which this UI message has been created;

a button configuration attribute indicating a configuration of command buttons in the display container used to display the UI message;

a default button attribute indicating which command button in the display container used to display the UI message is the default;

a cancel button attribute indicating which command button in the display container used to display the UI message is activated when the display container is canceled;

at least one button text attribute containing a text of a command button in the display container used to display the UI message;

at least one owner attribute identifying an owner of the UI message;

at least one signoff attribute indicating whether the owner of the UI message has one of approved and denied the UI message; and a search conditions attribute indicating search options to search for a specific condition, wherein the search conditions may be pre-defined or customized.

32. The computer storage media having stored thereon a data structure representing a UI message, as recited in claim 31, wherein the text attribute containing the text of the UI message includes at least one token that is resolved at run time.

33. A computer storage medium having stored thereon a compilable data structure representing a condition for which a user interface ('UI') message, that has been merged with a compiled software application program prior to runtime of a compiled message-enabled software application program, suitable for appearing on the computer display of a computer system that is network connectable to one or more other computer systems via a network on which a UI is displayed to a user, the data structure comprising:

a compiled message-enabled software application program attribute representing a compiled message-enabled software application program for which a condition may occur;

a version attribute indicating that a version of the software application program to which the condition pertains;

a language attribute indicating a dominant language of a user audience to whom a UI message for the condition is displayed;

an audience attribute indicating a selected one of a type of user audience to whom the UI message for the condition is displayed, the type of user audience including a level of expertise of the user audience;

an condition ID attribute uniquely identifying the condition;

a type attribute indicating whether the UI message is displayed using a message catalog display container for one of ail error, a question, and information;

a message ID containing a unique identifier of the UI message that is displayed for the condition;

a symbol attribute containing a code symbol used to identify the condition;

a feature attribute identifying a feature of the compiled message-enabled software application program for which the condition occurs;

a subfeature attribute identifying a subfeature of the compiled message-enabled software application program for which the condition occurs;

a status attribute indicating a status of the condition, the status indicating one of whether the condition needs review, whether the condition has been reviewed, and whether the text of the message associated with the condition has been finalized;

an expected use attribute indicating whether the UI message is one of displayed using the message catalog display container and displayed inline;

a dependency attribute containing a list of components that may cause the condition to occur, the list of components including at least one of a list of online services, online components, and local components;

a parameter attribute containing a description of parameters passed for the UI message from the compiled message-enabled software application program for which the condition occurs;

a documentation attribute containing a description of documentation for the condition;

at least one owner attribute identifying an owner of the condition;

at least one signoff attribute indicating whether the owner of the condition has one of approved and denied the condition;

a search conditions attribute indicating one or more search options to search for the condition ID attribute or the symbol attribute, wherein the search may be a pre-defined search or a custom search;

a search results attribute identifying search results in response to the search, wherein the search results attribute identifies the UI message and the status of the UI message; and a bulk editing attribute identifying available bulk editing options for a plurality of UI messages, wherein the bulk editing attribute identifies the plurality of UI messages to be edited upon receiving a user selection of one or more UI messages while preserving the UI messages associated with versions that are not currently being bulk edited.

34. The computer storage medium having stored thereon a data structure representing a condition, as recited in claim 33, wherein the documentation attribute containing documentation of the condition includes text describing at least one of a cause of the condition, a context of the condition, a workaround for the condition, and a resolution of the condition.

35. The computer storage medium having stored thereon a data structure representing a condition, as recited in claim 34, wherein the documentation is described for the public.

36. The computer storage medium having stored thereon a data structure representing a condition, as recited in claim 34, wherein the documentation is described for internal use.

37. The computer storage medium having stored thereon a data structure representing a condition, as recited in claim 33, wherein the documentation attribute containing documentation of the condition includes text describing an alias to which occurrences of the condition should escalate.

* * * * *

UNITED STATES PATENT AND TRADEMARK OFFICE
CERTIFICATE OF CORRECTION

PATENT NO. : 7,657,554 B2
APPLICATION NO. : 10/982531
DATED : February 2, 2010
INVENTOR(S) : Murphy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 319 days.

Signed and Sealed this

Thirtieth Day of November, 2010

David J. Kappos
*Director of the United States Patent and Trademark Office*